United States Patent
Ye et al.

(10) Patent No.: US 12,507,327 B2
(45) Date of Patent: Dec. 23, 2025

(54) COOKING DEVICE

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Bin Ye, Foshan (CN); Dongdong Wang, Foshan (CN); Kelei Sun, Foshan (CN); Yanqing Deng, Foshan (CN); Shigang Zhang, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 1035 days.

(21) Appl. No.: 17/560,265

(22) Filed: Dec. 23, 2021

(65) Prior Publication Data
US 2022/0210876 A1   Jun. 30, 2022

(30) Foreign Application Priority Data

Dec. 31, 2020 (CN) .......................... 202011639847.6
Dec. 31, 2020 (CN) .......................... 202011642184.3
(Continued)

(51) Int. Cl.
*H05B 6/64* (2006.01)
*F24C 15/20* (2006.01)
(Continued)

(52) U.S. Cl.
CPC ....... *H05B 6/6473* (2013.01); *F24C 15/2042* (2013.01); *F24C 15/325* (2013.01);
(Continued)

(58) Field of Classification Search
CPC .... F24C 15/20; F24C 15/2042; F24C 15/325; H05B 6/642; H05B 6/6423; H05B 6/6429; H05B 6/6473; H05B 6/707
(Continued)

(56) References Cited

U.S. PATENT DOCUMENTS 3,783,219 A * 1/1974 Tateda ................. H05B 6/6482
                                                      219/400
2008/0105249 A1* 5/2008 McFadden .............. F24C 15/32
                                                       126/21 A

FOREIGN PATENT DOCUMENTS

CN  205213067 U   5/2016
CN  105662171 A   6/2016
(Continued)

OTHER PUBLICATIONS

Translation of KR100780335, "Heating Cooker Including an Air Channel For Guiding Flow of Air Generated By a Blower", Nov. 30, 2007 (Year: 2007).*
(Continued)

*Primary Examiner* — Quang T Van
(74) *Attorney, Agent, or Firm* — K&L Gates LLP

(57) ABSTRACT

The present application discloses a cooking device, which includes a cabinet; the cabinet includes an inner cavity, a first heating assembly and a second heating assembly; the inner cavity is provided with a cooking chamber, as well as a first side wall and a second side wall that are arranged opposite to each other, the first side wall is provided with a first ventilation structure, and the second side wall is provided with a second ventilation structure; the first heating assembly is arranged outside the inner cavity and arranged corresponding to the first ventilation structure, and is configured to circularly heat air in the cooking chamber; the second heating assembly is arranged outside the inner cavity
(Continued)

and arranged corresponding to the second ventilation structure, and is configured to circularly heat the air in the cooking chamber.

6 Claims, 10 Drawing Sheets

(30) Foreign Application Priority Data

Dec. 31, 2020 (CN) .................. 202023351902.X
Dec. 31, 2020 (CN) .................. 202023352426.3
Dec. 31, 2020 (CN) .................. 202023352549.7

(51) Int. Cl.
*F24C 15/32* (2006.01)
*H05B 6/70* (2006.01)

(52) U.S. Cl.
CPC ........... *H05B 6/642* (2013.01); *H05B 6/6429* (2013.01); *H05B 6/707* (2013.01)

(58) Field of Classification Search
USPC ....... 219/681, 678, 679, 680, 685, 725, 735, 219/756, 757, 400, 385, 369, 370, 371, 219/386, 388, 533; 99/355, 426, 447, 99/448, 480, 483; 126/121 A, 261, 126/285 B, 110 A, 246
See application file for complete search history.

(56) References Cited

FOREIGN PATENT DOCUMENTS

| | | |
|---|---|---|
| CN | 205641043 U | 10/2016 |
| CN | 205842776 U | 12/2016 |
| CN | 107490030 A | 12/2017 |
| CN | 108354466 A | 8/2018 |
| CN | 208658995 U | 3/2019 |
| CN | 111248766 A | 6/2020 |
| CN | 214370421 U | 10/2021 |
| KR | 100780335 B1 | 11/2007 |
| WO | 2017166457 A1 | 10/2017 |

OTHER PUBLICATIONS

First OA mailed Sep. 6, 2022 of CN Application No. 202011639847.6.
The second OA mailed Apr. 28, 2023 for CN Application No. 202011639847.6.
First OA Received in CN Application No. 202011642184.3; mailed Dec. 30, 2024.

* cited by examiner

COOKING DEVICE

CROSS-REFERENCES TO RELATED APPLICATIONS

The present application claims benefits of Chinese Application Nos. 202023351902.X, 202023352549.7, 202023352426.3, 202011639847.6, and 202011642184.3, filed with CNIPA on Dec. 31, 2020, the contents of which are hereby incorporated by reference in its entirety.

FIELD

The present application relates to the field of household appliances, and in particular to a cooking device.

BACKGROUND

This section provides only background information related to the present disclosure, which is not necessarily the prior art.

A cooking device (e.g., a microwave oven or an OTR (over-the-range, which is located above the stove), etc.) typically includes a hot air assembly and an inner cavity with a cooking chamber. The hot air assembly is arranged outside the inner cavity, and the cooking chamber communicates with the hot air assembly through an air inlet and an air outlet. The hot air assembly sucks out air in the cooking chamber through the air outlet and heats it; then, the heated air is sent into the cooking chamber through the air inlet to realize the heating of the food in the cooking chamber.

In the prior art, the hot air assembly is arranged correspondingly to one side wall of the inner cavity, and the air inlet and the air outlet are both arranged on the side wall. During the cooking process of the food, a heating assembly circularly heats the air in the cooking chamber, However, the hot air assembly can only circularly heat the air in the cooking chamber on one side, and the food close to the side with the hot air assembly is heated fast, and the food away from the side with the hot air assembly is heated slowly, resulting in uneven heating of the food and lowering a cooking quality of the food.

SUMMARY

Embodiments of the present application are at least to solve the problem of how to ensure that the food is heated evenly to improve the cooking quality of the food.

The present application proposes a cooking device, which includes a cabinet, the cabinet including:
  an inner cavity, which is provided with a cooking chamber, as well as a first side wall and a second side wall that are arranged opposite to each other, the first side wall being provided with a first ventilation structure, and the second side wall being provided with a second ventilation structure;
  a first heating assembly, which is arranged outside the inner cavity and arranged corresponding to the first ventilation structure, and which is configured to circularly heat air in the cooking chamber; and
  a second heating assembly, which is arranged outside the inner cavity and arranged corresponding to the second ventilation structure, and which is configured to circularly heat the air in the cooking chamber.

According to the cooking device of the present application, the first side wall and the second side wall of the cooking chamber are arranged opposite to each other, the first heating assembly is arranged outside the first side wall and arranged corresponding to the first ventilation structure, and the second heating assembly is arranged outside the second side wall and arranged corresponding to the second ventilation structure. When heating the food in the cooking chamber, both the first heating assembly and the second heating assembly are activated, in which the first heating assembly circularly heats the air in the cooking chamber on the side of the first side wall, and the second heating assembly circularly heats the air in the cooking chamber on the side of the second side wall. By circularly heating the air in the cooking chamber on two opposite sides of the cooking chamber respectively, a convection structure is formed on the two opposite sides of the food, and the food in the cooking chamber is heated evenly on both sides, which improves the cooking quality of the food.

In addition, the cooking device according to the present application may further have the following additional embodiments.

In some embodiments of the present application, the first ventilation structure includes a first air inlet hole and at least one first air outlet hole, in which the first air inlet hole is located in the middle of the first side wall, and the first heating assembly is configured to suck out the air in the cooking chamber from the at least one first air outlet hole, heat the sucked-out air, and then send it into the cooking chamber through the first air inlet hole.

In some embodiments of the present application, the first heating assembly includes a first air duct shell, which is arranged outside the first side wall and forms a first hot air cavity with the first side wall, and both the first air inlet hole and the at least one first air outlet hole communicate with the first hot air cavity.

In some embodiments of the present application, the first heating assembly further includes a first heating pipe cover, a first heating pipe, a first driving member and a first fan blade, in which the first heating pipe cover, the first heating pipe and the first fan blade are all arranged in the first hot air cavity, and the first driving member is arranged outside the first hot air cavity and is drivingly connected with the first fan blade.

In some embodiments of the present application, the first heating pipe fits with the first heating pipe cover and is arranged in a circumferential direction of the first fan blade.

In some embodiments of the present application, the first fan blade is a first axial flow fan blade.

In some embodiments of the present application, the first side wall is formed with a first raised structure with a first air outflow end face on a side facing the cooking chamber, the first fan blade is arranged corresponding to the first raised structure, and the first air outlet hole is provided on the first air outflow end face.

In some embodiments of the present application, the second ventilation structure includes a second air inlet hole and at least one second air outlet hole, in which the second air inlet hole is located in the middle of the second side wall, and the second heating assembly is configured to suck out the air in the cooking chamber from the at least one second air outlet hole, heat the sucked-out air, and then send it into the cooking chamber through the second air inlet hole.

In some embodiments of the present application, the second heating assembly includes a second air duct shell, which is arranged outside the second side wall and forms a second hot air cavity with the second side wall, and both the second air inlet hole and the at least one second air outlet hole communicate with the second hot air cavity.

In some embodiments of the present application, the second heating assembly further includes a second heating pipe cover, a second heating pipe, a second driving member and a second fan blade, in which the second heating pipe cover, the second heating pipe and the second fan blade are all arranged in the second hot air cavity, and the second driving member is arranged outside the second hot air cavity and is drivingly connected with the second fan blade.

In some embodiments of the present application, the second heating pipe fits with the second heating pipe cover and is arranged in a circumferential direction of the second fan blade.

In some embodiments of the present application, the second fan blade is a second axial flow fan blade.

In some embodiments of the present application, the second side wall is formed with a second raised structure with a second air outflow end face on a side facing the cooking chamber, the second fan blade is arranged correspondingly to the second raised structure, and the second air outlet hole is provided on the second air outflow end face.

In some embodiments of the present application, the second air outflow end face is parallel to the first air outflow end face.

In some embodiments of the present application, the cooking device further includes a fume exhaust duct and a fan assembly, and the fan assembly is arranged in the fume exhaust duct.

In some embodiments of the present application, the cooking device further includes an installation bracket, the cabinet is detachably arranged on the installation bracket, and the fume exhaust duct is arranged in the cabinet or in the installation bracket.

The present application proposes a cooking device, which includes a cabinet, the cabinet including:
  an inner cavity which is provided with a cooking chamber, a side wall of the inner cavity being provided with an air inlet hole and at least one air outlet hole, and the air inlet hole being arranged corresponding to the middle of the cooking chamber; and
  a heating assembly, which is arranged outside the cooking chamber, and which is configured to suck out air in the cooking chamber from the at least one air outlet hole, heat the sucked-out air, and then send it into the cooking chamber through the air inlet hole.

In addition, the cooking device according to the present application may further have the following additional embodiments.

In some embodiments of the present application, the heating assembly includes an air duct shell, which is arranged outside the inner cavity and forms a hot air cavity with an outer surface of the inner cavity, and both the air inlet hole and the at least one air outlet hole communicate with the hot air cavity.

In some embodiments of the present application, the heating assembly further includes: a heating pipe cover, a heating pipe, a driving member and a fan blade, in which the heating pipe cover, the heating pipe and the fan blade are all arranged in the hot air cavity, and the driving member is arranged outside the hot air cavity and is drivingly connected with the fan blade.

In some embodiments of the present application, the heating pipe fits with the heating pipe cover and is arranged in a circumferential direction of the fan blade; and/or
  the fan blade is an axial flow fan blade.

In some embodiments of the present application, the air inlet hole and at least one air outlet hole are arranged spaced apart on the side wall of the cooking chamber, and the air inlet hole is located in the middle of the side wall.

In some embodiments of the present application, the side wall is formed with a raised structure with an air outflow end face on a side facing the cooking chamber, the fan blade is arranged corresponding to the raised structure, and the air inlet hole is provided on the air outflow end face.

In some embodiments of the present application, the air outflow end face is inclinedly arranged in a direction facing a bottom surface of the cooking chamber; or
  the air outflow end face is inclinedly arranged facing a rotational direction of the food in the cooking chamber.

In some embodiments of the present application, the number of the air outlet hole is plural, and air outlet holes are arranged at intervals around the air inlet hole.

In some embodiments of the present application, the cooking device further includes a fume exhaust duct and a fan assembly, and the fan assembly is arranged in the fume exhaust duct.

In some embodiments of the present application, the cooking device further includes an installation bracket, the cabinet is detachably arranged on the installation bracket, and the fume exhaust duct is arranged in the cabinet or in the installation bracket.

The present application proposes a cooking device, which includes a cabinet and a microwave generating assembly; the cabinet includes an inner cavity with a cooking chamber, the inner cavity is provided with an inclined plate for forming the cooking chamber, and a magnetron of the microwave generating assembly is arranged on the inclined plate and is located outside the cooking chamber.

In addition, the cooking device according to the present application may further have the following additional embodiments.

In some embodiments of the present application, the inner cavity includes a rear side plate and a top plate, and the top plate is connected to the rear side plate through the inclined plate.

In some embodiments of the present application, the inclined plate includes a first plate body and a second plate body connected with each other at an obtuse angle, the first plate body is perpendicularly connected to the rear side plate and is in parallel to the top plate, and the second plate body is connected to the top plate.

In some embodiments of the present application, the cabinet further includes a casing with a receiving structure, the casing is arranged outside the inner cavity, and the magnetron is arranged on the inclined plate and is arranged corresponding to the receiving structure.

In some embodiments of the present application, the receiving structure is a right-angle structure formed in a direction away from the inclined plate; and/or
  the microwave generating assembly further includes a waveguide, which is arranged on the inclined plate, and the magnetron communicates with the cooking chamber through the waveguide.

In some embodiments of the present application, the microwave generating assembly further includes a heat dissipation device and a power device, the heat dissipation device being arranged on the top plate, and the power device being arranged between the magnetron and the heat dissipation device.

In some embodiments of the present application, the heat dissipation device includes an impeller, a driving member, and an air guide member with a heat dissipation air duct; in which the impeller is arranged in the heat dissipation air duct and is drivingly connected with the driving member, the power device is arranged in the heat dissipation air duct, and an air inlet of the heat dissipation air duct is arranged corresponding to the magnetron.

In some embodiments of the present application, the cooking device further includes a fume exhaust duct and a fan assembly, and the fan assembly is arranged in the fume exhaust duct and is arranged corresponding to the inclined plate.

In some embodiments of the present application, the fume exhaust duct is arranged in the cabinet.

In some embodiments of the present application, the cooking device further includes an installation bracket, the cabinet is detachably arranged on the installation bracket, and the fume exhaust duct is arranged in the installation bracket.

The present application proposes a cooking device, which includes a cabinet and a fan assembly; the cabinet includes an inner cavity having a cooking chamber, the inner cavity includes an inclined plate for forming the cooking chamber, and a fan body of the fan assembly is located outside the cooking chamber and is arranged corresponding to the inclined plate.

In addition, the cooking device according to the present application may further have the following additional embodiments.

In some embodiments of the present application, the inner cavity further includes a rear side plate and a top plate, and the top plate is connected to the rear side plate through the inclined plate.

In some embodiments of the present application, the inclined plate includes a first plate body and a second plate body connected with each other at an obtuse angle, the first plate body is perpendicularly connected to the rear side plate and is in parallel to the top plate, and the second plate body is connected to the top plate.

In some embodiments of the present application, the cabinet further includes a casing; the casing is arranged outside the inner cavity, and is provided with a receiving structure at a position corresponding to the inclined plate, and the fan body is arranged corresponding to the receiving structure.

In some embodiments of the present application, the fan assembly is arranged between the casing and the inner cavity, and the receiving structure is a right-angle structure formed in a direction away from the inclined plate.

In some embodiments of the present application, the cooking device further includes an installation bracket, the cabinet is detachably arranged on the installation bracket, and the fan assembly is arranged in the installation bracket.

In some embodiments of the present application, the receiving structure is a concave structure formed toward the side of the inclined plate, and the fan assembly further includes a fan housing, which is protrudingly arranged on the installation bracket and which can be correspondingly arranged in the concave structure.

In some embodiments of the present application, a space on a side of the fan housing away from the concave structure can receive the fan body.

In some embodiments of the present application, a fume exhaust duct is provided in the cooking device, and the fan assembly is arranged in the fume exhaust duct.

In some embodiments of the present application, the number of the fan is plural, and fans are all arranged on the inclined plate and are arranged at intervals in a width direction of the cooking device.

The present application proposes a cooking device, which includes a cabinet; the cabinet includes an inner cavity having a cooking chamber, and at least one heating assembly, and the inner cavity is provided with an inclined plate for forming the cooking chamber; the inclined plate is provided with an air inlet and an air outlet, and the at least one heating assembly is arranged on the inclined plate and is located outside the cooking chamber, and is configured to discharge cold air out of the cooking chamber through the air outlet and send hot air into the cooking chamber from the air inlet.

In addition, the cooking device according to the present application may further have the following additional embodiments.

In some embodiments of the present application, the heating assembly includes an air duct shell, which is arranged outside the inner cavity and forms a hot air cavity with the inclined plate, and both the air inlet and the air outlet communicate with the hot air cavity.

In some embodiments of the present application, the heating assembly further includes a heating pipe cover, a heating pipe, a driving member and a fan blade; in which the heating pipe cover, the heating pipe and the fan blade are all arranged in the air cavity, and the driving member is arranged outside the hot air cavity and is drivingly connected with the fan blade.

In some embodiments of the present application, the heating pipe fits with the heating pipe cover and is arranged in a circumferential direction of the fan blade.

In some embodiments of the present application, the fan blade is a centrifugal fan blade.

In some embodiments of the present application, the heating assembly further includes a heat dissipation fan, and the heat dissipation fan is arranged outside the air duct shell and is drivingly connected with the driving member.

In some embodiments of the present application, the heating assembly further includes a fixing bracket, and the driving member is connected with the air duct shell through the fixing bracket.

In some embodiments of the present application, the cooking device further includes a fume exhaust duct and a fan assembly, and the fan assembly is arranged in the fume exhaust duct.

In some embodiments of the present application, the fume exhaust duct is arranged in the cabinet.

In some embodiments of the present application, the cooking device further includes an installation bracket, the cabinet is detachably arranged on the installation bracket, and the fume exhaust duct is arranged in the installation bracket.

BRIEF DESCRIPTION OF THE DRAWINGS

The accompanying drawings are only used for the purpose of illustrating the embodiments, and should not be considered as a limitation to the present disclosure. In one embodiment, throughout the drawings, the same reference numerals are used to denote the same components, in which.

LIST OF REFERENCE SIGNS

Figure 1:
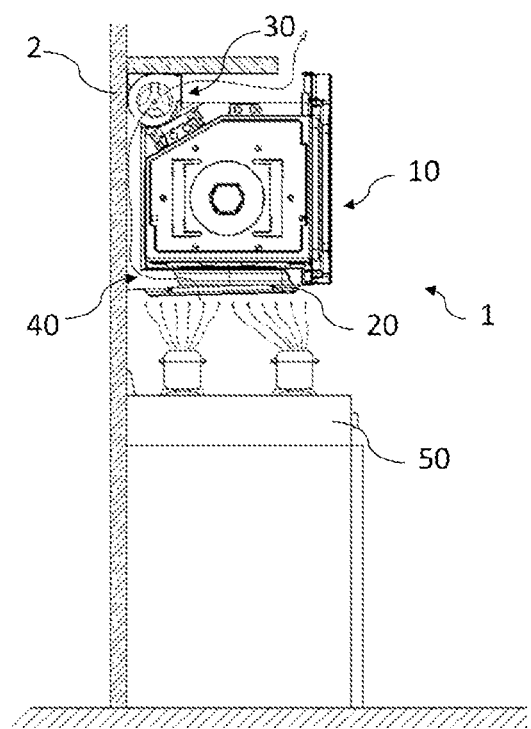
FIG. 1 schematically shows a schematic structural view of a cooking device according to an example of the present application.

1: cooking device; 2: wall;
10: cabinet;
11: inner cavity; 111: cooking chamber; 112: inclined plate; 1121: first plate body; 1122: second plate body; 1123: air inlet; 1124: air outlet; 113: rear side plate; 114: top plate; 115: side wall; 1151: air inlet hole; 1152: air outlet hole; 1153: air outflow end face; 116: first side wall; 1161: first ventilation structure; 11611: first air inlet hole; 11612: first air outlet hole; 1162: first air outflow end face; 117: second side wall; 1171: second ventilation structure; 11711: second air outlet hole; 11712: second air inlet hole; 1172: second air outflow end face; 118: rear plate;
12: casing; 121: receiving structure;
13: door;
14: turntable;
20: installation bracket;

30: fan assembly; 31: fan body; 32: fan housing;
40: fume exhaust duct;
50: stove;
60: heating assembly;
61: air duct shell; 62: heating pipe cover; 63: heating pipe; 64: driving member; 65: fan blade; 66: heat dissipation fan; 67: fixing bracket;
601: first heating assembly; 6011: first air duct shell; 6012: first heating pipe cover; 6013: first heating pipe; 6014: first driving member; 6015: first fan blade; 6016: first heat dissipation fan; 6017: first fixing bracket;
602: second heating assembly; 6021: second air duct shell; 6022: second heating pipe cover; 6023: second heating pipe; 6024: second driving member; 6025: second fan blade; 6026: second heat dissipation fan; 6027: second fixing bracket;
70: microwave generating assembly;
71: magnetron; 72: heat dissipation device; 721: impeller; 722: driving member; 723: air guide member; 7231: heat dissipation air duct; 73: power device; 74: waveguide.

DETAILED DESCRIPTION OF THE DISCLOSURE

Hereinafter, exemplary embodiments of the present disclosure will be described in more detail with reference to the accompanying drawings. Although the exemplary embodiments of the present disclosure are shown in the drawings, it should be understood that the present disclosure may be implemented in various forms and should not be limited by the embodiments set forth herein.

It should be understood that the terms used herein are only for the purpose of describing specific exemplary embodiments, and are not intended to be limitative. Unless clearly indicated otherwise in the context, singular forms "a", "an", and "said" as used herein may also mean that plural forms are included. Terms "include", "comprise", "contain" and "have" are inclusive, and therefore indicate the existence of the stated features, steps, operations, elements and/or components, but do not exclude the existence or addition of one or more other features, steps, operations, elements, components, and/or combinations thereof. The method steps, processes, and operations described herein should not be interpreted as requiring them to be executed in the specific order described or illustrated, unless the order of execution is clearly indicated. It should also be understood that additional or alternative steps may be used.

Although terms "first", "second", "third" and the like may be used herein to describe multiple elements, components, regions, layers and/or sections, these elements, components, regions, layers and/or sections should not be limited by these terms. These terms may only be used to distinguish one element, component, region, layer or section from another region, layer or section. Unless clearly indicated in the context, terms such as "first", "second" and other numerical terms do not imply an order or sequence when they are used herein. Therefore, the first element, component, region, layer or section discussed below may be referred to as a second element, component, region, layer or section without departing from the teachings of the exemplary embodiments.

For ease of description, spatial relative terms may be used herein to describe the relationship of one element or feature relative to another element or feature as shown in the drawings. These relative terms are, for example, "inner", "outer", "inside", "outside", "below", "under", "above", "over", etc. These spatial relative terms are intended to include different orientations of the device in use or in operation in addition to the orientation depicted in the drawings. For example, if the device in the figure is turned over, then elements described as "below other elements or features" or "under other elements or features" will be oriented as "above the other elements or features" or "over the other elements or features". Thus, the exemplary term "below" may include orientations of both above and below. The device can be otherwise oriented (rotated by 90 degrees or in other directions), and the spatial relationship descriptors used herein will be explained accordingly.

In an embodiment of the present application, as shown in FIG. 1 and FIGS. 10 to 13, a cooking device 1 is proposed according to this embodiment. The cooking device 1 includes a cabinet 10 and a fan assembly 30. The cabinet 10 includes an inner cavity 11 having a cooking chamber 111. The inner cavity 11 includes an inclined plate 112 for forming the cooking chamber 111. A fan body 31 of the fan assembly 30 is located outside the cooking chamber 111 and is arranged corresponding to the inclined plate 112. The inclined plate 112 for forming the cooking chamber 111 is located at a corner position of the cooking chamber 111. When the fan body 31 is arranged outside the inner cavity 11 and arranged corresponding to the inclined plate 112, a space of the cooking device 1 in a height direction occupied by the fan body 31 is reduced. Therefore, the size of the cooking chamber 111 in the height direction of the cooking device 1 can be increased. As compared with the prior art, a volume of the cooking chamber 111 is effectively increased, which enhances the cooking capability to food.

It should be understood that when a user is facing the cooking device 1, a distance from the side of the cooking device 1 close to the user to the side of the cooking device 1 away from the user is a width of the cooking device 1, a distance from the user's left-hand side to the user's right-hand side is a length of the cooking device 1, and a distance from the side of the cooking device 1 close to the bottom surface to the side of the cooking device 1 away from the bottom surface is a height of the cooking device 1.

In the prior art, the fan body 31 is located at the top of the inner cavity 11, and the top of the inner cavity 11 forms a rectangular space in the width direction of the cooking device 1 and the length direction of the cooking device 1. A volume of the rectangular space is much larger than that of the fan body 31. Due to the existence of the rectangular space, the size of the cooking chamber 111 in the height direction of the cooking device 1 is affected. In some examples of this embodiment, the inclined plate 112 is arranged at the corner position of the cooking chamber 111, and the fan body 31 is arranged corresponding to the inclined plate 112. The fan body 31 only occupies a small space in the height direction and other directions (width or length direction) of the cooking device 1 after installation. Therefore, the overall space utilization of the cooking device 1 can be improved, and the volume of the cooking chamber 111 is effectively increased, to improve the processing capability of the cooking device 1 to the food.

Figure 10:
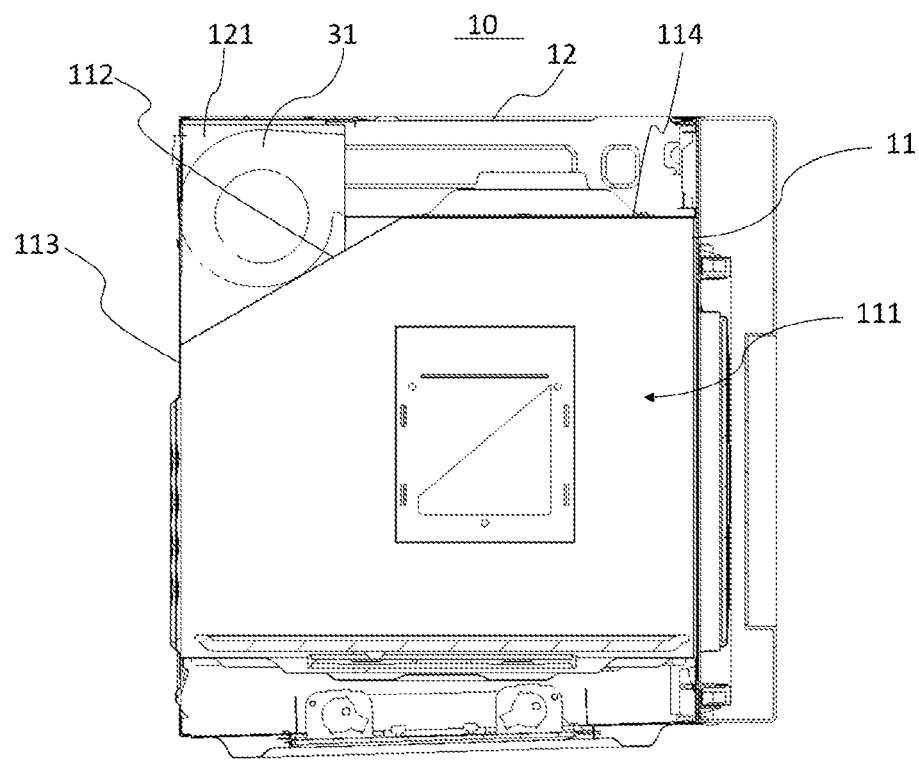
FIG. 10 is a schematic structural view when the cabinet of the cooking device shown in FIG. 2 is in a sixth example.
Figure 11:
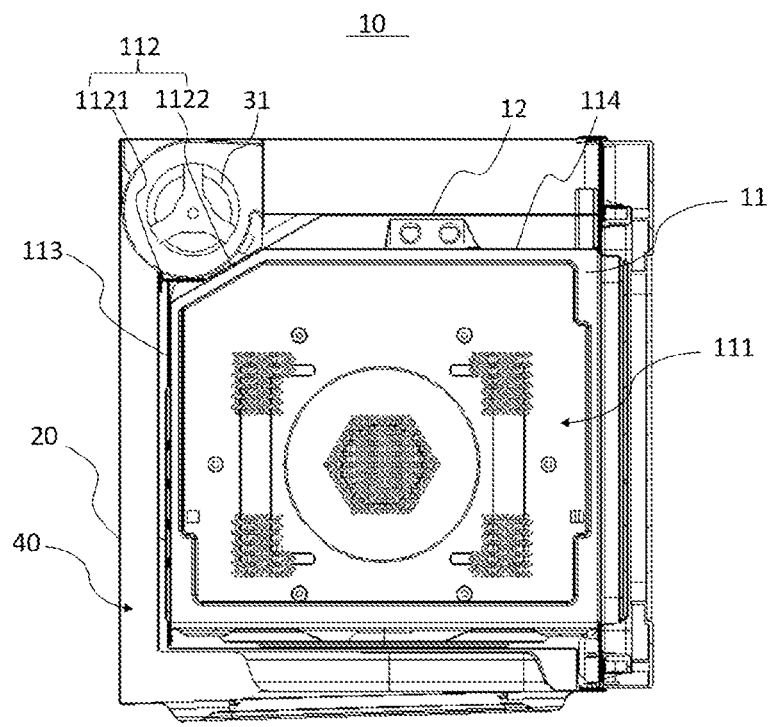
FIG. 11 is a schematic structural view when the cabinet of the cooking device shown in FIG. 2 is in a seventh example.

It is further understood that as shown in FIG. 10 or FIG. 11, the inner cavity 11 further includes a rear side plate 113 and a top plate 114, and the top plate 114 is connected to the rear side plate 113 through the inclined plate 112. In one embodiment, the rear side plate 113 and the top plate 114 are respectively configured to form the cooking chamber 111, and the rear side plate 113 is connected to the top plate 114 through the inclined plate 112, that is, the inclined plate 112 is arranged at a corner position above the rear of the cooking chamber 111. When installing the fan body 31, the fan body 31 is arranged outside the cooking chamber 111 and arranged corresponding to the inclined plate 112, that is, the fan body 31 is installed at the corner position outside the cooking chamber 111, which further reduces the volume occupied by the fan body 31 during installation, and the volume of the cooking chamber 111 can be effectively increased.

It should be understood that in the present application, the rear side plate 113 and the top plate 114 are spaced apart and perpendicular to each other, and the two are connected and fixed by the inclined plate 112.

It should be pointed out that as shown in FIG. 10 and FIG. 11, the inner cavity 11 further includes a bottom plate, and two side walls arranged opposite to each other. The two side walls are arranged on left and right sides of the cooking chamber 111 in a way of parallel with and spaced apart from each other. The bottom plate is arranged at a bottom of the cooking chamber 111 and connected and fixed to the two side walls respectively. The rear side plate 113 is connected and fixed to the two side walls and the bottom plate respectively, and the top plate 114 is connected and fixed to the two side walls respectively. Meanwhile, the inclined plate 112 is also connected and fixed the two side walls respectively. Through the interconnection of the bottom plate, the two side walls, the top plate 114, the rear side plate 113 and the inclined plate 112, the inner cavity 11 with an approximately rectangular structure is formed. The shape of the cooking chamber 111 inside the inner cavity 11 is consistent with the shape of the inner cavity 11, to ensure that the volume of the cooking chamber 111 is maximized, and the processing capability of the cooking device 1 to the food is effectively improved.

In addition, the rear side plate 113, the inclined plate 112 and the top plate 114 may be of a split structure or an integral structure. In a case where the rear side plate 113, the inclined plate 112 and the top plate 114 are of a split structure, they are processed by stamping (all the three are metal sheets), to improve the convenience of processing. In a case where the rear side plate 113, the inclined plate 112 and the top plate 114 are a split structure, they are processed and manufactured respectively, and then connected and fixed by welding or riveting. The split processing and manufacturing have a low cost, which effectively reduces the manufacturing cost of the cooking device 1.

Figure 2:
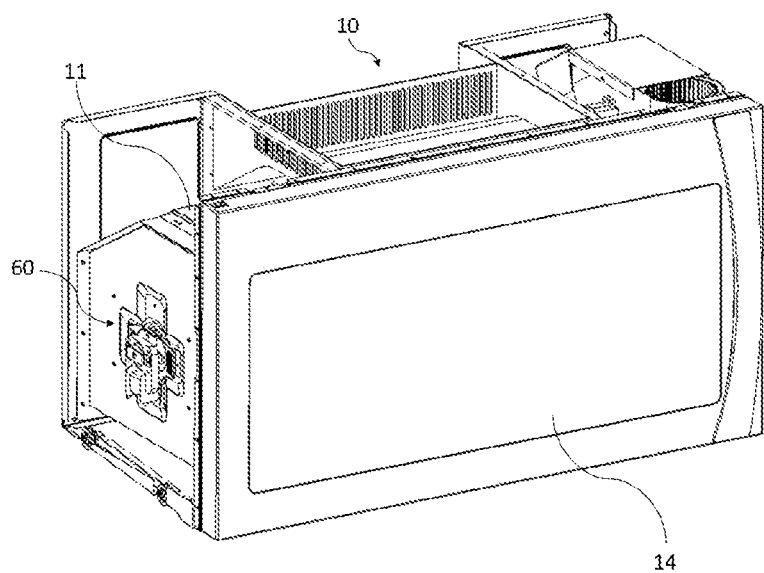
FIG. 2 is a schematic structural view (partial structure) of a cabinet of the cooking device shown in FIG. 1.

In addition, as shown in FIG. 2, the cabinet 10 further includes a door 13. The door 13 is arranged at an opening of the inner cavity 11 and fits with a front plate of the inner cavity 11, and opening or closing of the cooking chamber 111 can be realized by opening and closing of the door 13.

In some examples of this embodiment, as shown in FIG. 10, the inclined plate 112 is of a flat plate structure, and a width of the flat plate structure (a distance of the inclined plate 112 between the top plate 114 and the rear side plate 113) is larger than a diameter of the fan body 31. When the fan body 31 corresponds to the inclined plate 112, installation of the fan body 31 only affects part of the space at the top of the rear side of the cooking chamber 111, and the volume of the cooking chamber 111 is effectively increased compared with the previous case.

In some examples of this embodiment, as shown in FIG. 11, the inclined plate 112 includes a first plate body 1121 and a second plate body 1122 connected with each other at an obtuse angle. The first plate body 1121 is perpendicularly connected to the rear side plate 113 and is parallel to the top plate 114. The second plate body 1122 is connected to the top plate 114. In one embodiment, the first plate body 1121 and the second plate body 1122 are connected to each other, in which the first plate body 1121 is perpendicularly connected to the rear side plate 113, and the second plate body 1122 is connected to the top plate 114. The fan body 31 corresponds to the position of the inclined plate 112, and the fan body 31 is typically of a cylindrical structure. An included angle between the first plate body 1121 and the second plate body 1122 is set to an obtuse angle (at the connection position outside the cooking chamber 111), and the shape between the first plate body 1121 and the second plate body 1122 better fits the fan body 31, which can further reduce the space occupied by the fan body 31 during installation, and the overall space utilization of the cooking device 1 is effectively improved.

In some examples of this embodiment, the inclined plate 112 may also be an arc-shaped plate, and the shape of the arc-shaped plate is adapted to the shape of the fan body 31, and the waste of space can be further reduced and the space utilization of the cooking device 1 can be further improved. As such, the volume of the cooking chamber 111 can be effectively increased, and the processing capability to the food is effectively improved.

Further, as shown in FIG. 10 or FIG. 11, the cabinet 10 further includes a casing 12, which is arranged outside the inner cavity 11. The casing 12 is provided with a receiving structure at a position corresponding to the inclined plate 112, and the fan body 31 is arranged corresponding to the receiving structure. In one embodiment, the casing 12 is arranged outside the inner cavity 11, and the receiving structure is arranged corresponding to the inclined plate 112. When installing the fan body 31, the fan body 31 is arranged corresponding to the receiving structure of the casing 12 and also corresponding to the inclined plate 112, and the waste of space produced during the installation of the fan body 31 is further reduced and the overall space utilization of the cooking device 1 is further improved, to reduce the influence of the fan body 31 in the height direction of the cooking device 1, enabling the size of the cooking chamber 111 in the height direction to be increased, and further increasing the volume of the cooking chamber 111.

In some examples of this embodiment, as shown in FIG. 10, the fan assembly 30 is arranged between the casing 12 and the inner cavity 11, and the receiving structure is a right-angle structure formed in a direction away from the inclined plate 112. In one embodiment, the fan assembly 30 is arranged inside the cabinet 10, that is, between the inner cavity 11 and the casing. The position of the casing 12 corresponding to the inclined plate 112 is a right-angle structure, and this right-angle structure is the receiving structure. An installation space is enclosed by the right-angle structure and the inclined plate 112. The fan body 31 is located in the installation space, and is arranged corresponding to the right-angle structure and the inclined plate 112 respectively, and at the same time of installing the fan body 31, the influence of the fan body 31 to the cooking chamber 111 is reduced. Therefore, the volume of the cooking chamber 111 can be effectively increased, to improve the processing capability to the food.

Figure 12:
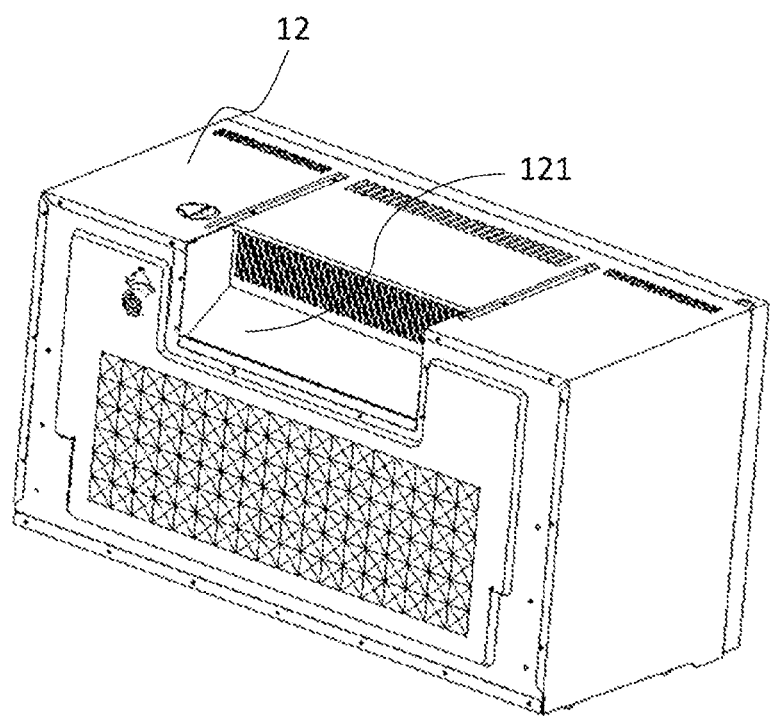
FIG. 12 is a schematic structural view of the cabinet shown in FIG. 11.
Figure 13:
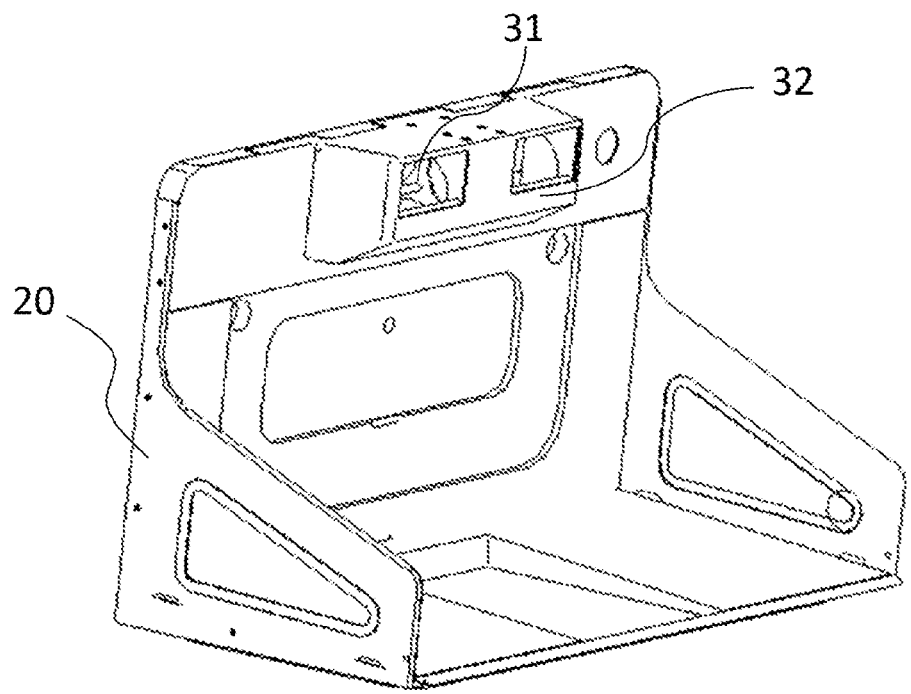
FIG. 13 is a schematic structural view of an installation bracket shown in FIG. 11.

In some examples of this embodiment, as shown in FIGS. 11 to 13, the cooking device 1 further includes an installation bracket 20. The cabinet 10 is detachably arranged on the installation bracket 20, and the fan assembly 30 is arranged in the installation bracket 20. In one embodiment, the installation bracket 20 is installed and fixed on a wall 2, the cabinet 10 and the installation bracket 20 are connected in a detachable manner, and the fan assembly 30 is arranged on the installation bracket 20. When the cabinet 10 is installed on the installation bracket 20, the fan body 31 of the fan assembly 30 is arranged corresponding to the receiving structure on the casing on the cabinet 10, to reduce the influence of the fan body 31 on the cooking chamber 111 while ensuring assembling, and the volume of the cooking chamber 111 is further increased, and the processing capability to the food is further improved.

Further, as shown in FIGS. 12 and 13, the receiving structure is a concave structure formed toward the side of the inclined plate 112, and the fan assembly 30 further includes a fan housing 32, which is protrudingly arranged on the installation bracket 20. The fan body 31 is arranged corresponding to the fan housing 32, and the fan housing 32 can be correspondingly arranged in the concave structure. In one embodiment, the fan body 31 is arranged in the fan housing 32. When the cabinet 10 fits with the installation bracket 20, the fan housing 32 is adaptively arranged in the concave structure, that is, an avoidance structure (concave structure) corresponding to the fan housing 32 is provided on the cabinet 10. Through the cooperation of the fan housing 32 and the avoidance structure, accommodation of the fan body 31 and the fan housing 32 is realized, to reduce the influence of the fan body 31 and the fan housing 32 on the cooking chamber 111, and the volume of the cooking chamber 111 is further increased.

Further, as shown in FIG. 13, the fan body 31 can be received in the space on the side of the fan housing 32 away from the concave structure. In one embodiment, by arranging the fan body 31 in the fan housing 32, the adverse influence of the external environment on the fan body 31 is avoided. When the cabinet 10 is installed on the installation bracket 20, the fan body 31 is electrically communicated with the cabinet 10, and the effective operation of the fan body 31 is ensured.

Further, as shown in FIG. 1, the cooking device 1 is provided therein with a fume exhaust duct 40, and the fan assembly 30 is arranged in the fume exhaust duct 40. In one embodiment, the fume exhaust duct 40 may be arranged either in the installation bracket 20 or in the cabinet 10, and the fan assembly 30 of the cooking device 1 is arranged in the fume exhaust duct 40. When the cooking device 1 is used for cooking, the fan assembly 30 is activated, and the oil fume generated during the cooking process is discharged through the fume exhaust duct 40, thus preventing the whole cooking process from the intrusion of oil fume, and effectively improving the user experience.

In addition, as shown in FIG. 1, a stove 50 is arranged below the cabinet 10 of the cooking device 1, and an inlet of the fume exhaust duct 40 is arranged close to the stove 50. The stove 50 and the cabinet 10 are spaced apart up-and-down, and the cabinet 10 is suspended above the stove 50 by the installation bracket 20. When the stove 50 is cooking the food, the oil fume and/or water vapor generated during the cooking process enters the fume exhaust duct 40 through the inlet of the fume exhaust duct 40 under the action of the fan assembly 30, and is discharged collectively, which further avoids the oil fume generated during the cooking process and further improves the user experience.

In an embodiment of the present application, as shown in FIGS. 1 to 6, a cooking device 1 is proposed according to this embodiment. The cooking device 1 includes a cabinet 10, and the cabinet 10 includes an inner cavity 11 and a heating assembly 60. The inner cavity 11 is provided with a cooking chamber 111, a side wall 115 of the inner cavity 11 is provided with an air inlet hole 1151 and at least one air outlet hole 1152, and the air inlet hole 1151 is arranged corresponding to the middle of the cooking chamber 111.

The heating assembly 60 is arranged outside the cooking chamber 111, and is configured to suck out the air in the cooking chamber 111 from the at least one first air outlet hole 1152, heat the sucked-out air, and then send it into the cooking chamber 111 through the first air inlet hole 1151.

In one embodiment, when the cooking device 1 is heating the food, the food is usually placed in the middle of the cooking chamber 111. After the heating assembly 60 is activated, under the action of the heating assembly 60, the air in the cooking chamber 111 is sucked out through the at least one air outlet hole 1152 and enters the heating assembly 60; the heating assembly 60 heats the incoming air and sends the hot air into the cooking chamber 111 through the air inlet hole 1151. The hot air entering the cooking chamber 111 heats the food for cooking. Since the air inlet hole 1151 is arranged corresponding to the middle of the cooking chamber 111, the hot air is directly blown toward the middle of the food after entering the cooking chamber 111, which improves a heating rate of the middle of the food, and the food is heated evenly and the cooking quality of the food is improved.

It should be understood that when the food is placed in the cooking chamber 111, the middle of the food is basically located in the middle of the cooking chamber 111. The food has a volume, and the density of the middle of the food is relatively high. The air outlet hole 1152 is arranged corresponding to the middle of the cooking chamber 111, and the hot air is directly blown toward the middle of the food after entering the cooking chamber 111, to first heat the middle of the food; the hot air after heating the middle of the food has a decreased temperature and flows along the surface of the food; finally, it leaves the cooking chamber 111 through the at least one air outlet hole 1152 and enters the heating assembly 60 again, to be heated by the heating assembly 60 again.

In addition, when the user is facing the cooking device 1, the side of the cooking device 1 on the left-hand side of the user is a left side of the cooking device 1, and the side of the cooking device 1 on the right-hand side of the user is a right side of the cooking device 1; the side of the cooking device 1 close to the user is a front side of the cooking device 1, and the side of the cooking device 1 away from the user is a rear side of the cooking device 1; the side of the cooking device 1 close to the bottom surface is a bottom side of the cooking device 1, and the side of the cooking device 1 away from the bottom surface is a top side of the cooking device 1. The side wall 115 of the inner cavity 11 generally refers to a left side wall, a right side wall or a rear side wall of the inner cavity 11, that is, the side wall of the inner cavity 11 on the left side of the cooking device 1 is the left side wall, the side wall of the inner cavity 11 on the right side of the cooking device 1 is the right side wall, and the side wall of the inner cavity 11 on the rear side of the cooking device 1 is the rear side wall.

Figure 3:
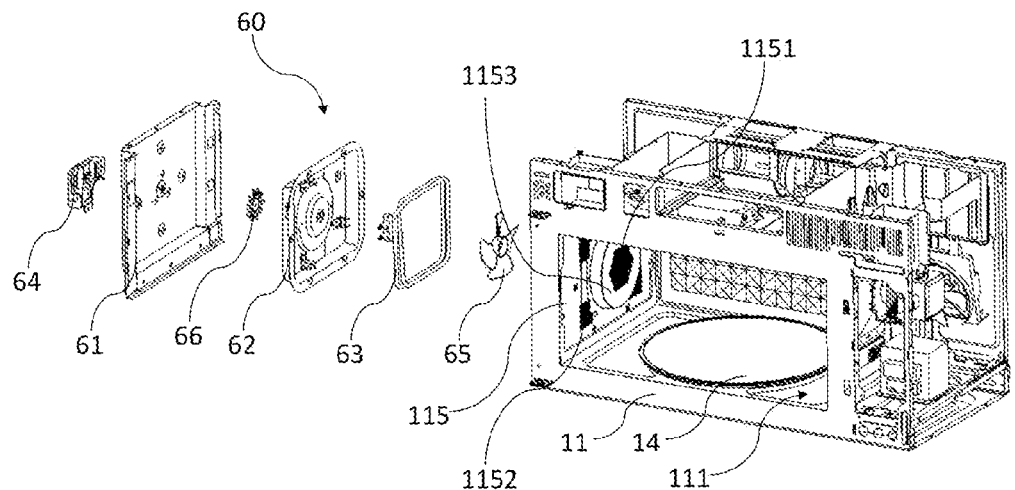
FIG. 3 is a schematic exploded structural view of the cabinet shown in FIG. 2.

It should be pointed out that as shown in FIG. 3, the air inlet hole 1151 and the at least one air outlet hole 1152 are both arranged on one side wall 115 of the inner cavity 11, in which the air inlet hole 1151 is arranged corresponding to the middle of the cooking chamber 111, and the at least one air outlet hole 1152 and the air inlet hole 1151 are arranged spaced apart, that is, the at least one air outlet hole 1152 is arranged offset from the middle of the cooking chamber 111. By adjusting the distance between the at least one air outlet hole 1152 and the air inlet hole 1151, the hot air flow field in the cooking chamber 111 can be adjusted to further improve the uniformity of heating the food.

In addition, in some examples of this embodiment, the air inlet hole 1151 is of a first mesh structure, which can increase the amount of air entering the cooking chamber 111, to increase the heating rate of the food. The at least one air outlet hole 1152 is of a second mesh structure, which can increase the air blowing-out rate of the cooking chamber 111, and the air circulation rate is increased, and the cooking efficiency of the food is further improved.

In some examples of this embodiment, the air inlet hole 1151 is a first grille, and the at least one air outlet hole 1152 is a second grille. By arranging the air inlet hole 1151 as a first grille and arranging the air outlet hole 1152 as a second grille, the air blow-in and blow-out area is further increased, and the flowing speed of the air is improved. In addition, the first grille can also be provided with a first driving mechanism, and the second grille can also be provided with a second driving mechanism, in which the first driving mechanism is configured to adjust the angle of the first grille, and the second driving mechanism is configured to adjust the angle of the second grille, to realize the adjustment of the air flow direction, and the cooking device 1 can meet the cooking requirements of different foods.

It is further understood that as shown in FIG. 3 to FIG. 6, the heating assembly 60 includes an air duct shell 61, and the air duct shell 61 is arranged outside the inner cavity 11 and cooperates with an outer surface of the inner cavity 11 to form a hot air cavity. Both the air inlet hole 1151 and the at least one air outlet hole 1152 communicate with the hot air cavity. In one embodiment, the air duct shell 61 is arranged outside the inner cavity 11, and the air duct shell 61 cooperates with the outer surface of the inner cavity 11. The air duct shell 61 and the outer surface of the inner cavity 11 enclose a hot air cavity, and the hot air cavity communicates with the cooking chamber 111 through the air inlet hole 1151 and the at least one air outlet hole 1152 respectively. When the cooking device 1 is used to cook the food, under the action of the heating assembly 60, the air inside the cooking chamber 111 enters the hot air cavity through the at least one air outlet hole 1152, and the air entering the hot air cavity is heated by the heating assembly 60 to form hot air; the heating assembly 60 sends the hot air into the cooking chamber 111 through the air inlet hole 1151, and the hot air is used to cook the food. By arranging the air duct shell 61, the air can circulate between the cooking chamber 111 and the hot air cavity, and during the circulation process, the air is effectively heated, and the heating and cooking of the food is carried out effectively, and the cooking quality of the food is further ensured.

It should be understood that the air duct shell 61 is arranged outside the inner cavity 11 and cooperates with the outer surface of the inner cavity 11, to reduce the air flow path and reducing the heat loss of the hot air, and the cooking efficiency of the food is ensured, and energy consumption of the cooking device 1 is reduced.

It should be pointed out that the connection between the air duct shell 61 and the outer surface of the inner cavity 11 is a detachable connection, and the detachable connection may be screwing, clamping, riveting, etc. In some examples of this embodiment, the air duct shell 61 and the outer surface of the inner cavity 11 are connected and fixed by screws. By using screw connection and fixation for convenient assembly, the efficiency of assembly can be effectively improved and the production cost of the cooking device 1 can be reduced.

In addition, the inner cavity 11 is generally a rectangular cavity, the side wall 115 of the inner cavity 11 is of a rectangular structure, and the size of the air duct shell 61 is close to the size of the side wall 115 of the inner cavity 11. A coverage area of the hot air cavity formed between the air duct shell 61 and the side wall 115 of the inner cavity 11 on the side wall 115 of the inner cavity 11 is slightly smaller than the area of the side wall 115 of the inner cavity 11, to increase the coverage area of the hot air in the cooking chamber 111 and further improving the cooking quality of the food.

Further, as shown in FIG. 3 to FIG. 6, the heating assembly 60 further includes: a heating pipe cover 62, a heating pipe 63, a driving member 64 and a fan blade 65. The heating pipe cover 62, the heating pipe 63 and the fan blade 65 are all arranged in the hot air cavity, and the driving member 64 is arranged outside the hot air cavity and is drivingly connected to the fan blade 65. In one embodiment, the air duct shell 61 cooperates with the outer surface of the inner cavity 11 and a hot air cavity is formed therebetween. The fan blade 65, the heating pipe 63 and the heating pipe cover 62 are all arranged in the hot air cavity. The driving member 64 is arranged outside the hot air cavity, and a driving shaft of the driving member 64 passes through the air duct shell 61 before being drivingly connected to the fan blade 65. When the heating assembly 60 is activated, the driving member 64 drives the fan blade 65 to rotate, and the heating pipe 63 is energized to generate heat. Under the action of the fan blade 65, the air in the cooking chamber 111 enters the hot air cavity through the at least one air outlet hole 1152. When the air entering the hot air cavity flows to the position of the heating pipe 63, it exchanges heat with the heating pipe 63, and the air is heated to form hot air. Under the action of the fan blade 65, the hot air enters the cooking chamber 111 through the air inlet hole 1151 to achieve heating and cooking of the food. The structure formed by the driving member 64 and the fan blade 65 effectively realizes the circulation of air between the cooking chamber 111 and the hot air cavity, and at the same time, the heating pipe 63 is used to effectively realize the heating of the air, to realize the heating and cooking of the food.

It should be pointed out that the heating pipe cover 62 is a half-shell structure with an opening. When installing the heating assembly 60, the opening of the heating pipe cover 62 is abutted and fixed on the outer surface of the inner cavity 11 (the heating pipe cover 62 and the outer surface of the inner cavity 11 are connected and fixed by fixing screws and other components), and the heating pipe cover 62 and the outer surface of the inner cavity 11 form a relatively closed heating space. The heating space communicates with the cooking chamber 111 through the air inlet hole 1151 and the at least one air outlet hole 1152 respectively. The heating pipe 63 and the fan blade 65 are both arranged in the heating space, the driving shaft of the driving member 64 passes through the air duct shell 61 and the heating pipe cover 62 before being connected to the fan blade 65, and the air in the cooking chamber 111 circulates between the heating space and the cooking chamber 111. By providing the heating pipe cover 62, heat dissipation of the heating pipe 63 is further avoided, and the heating rate of the air is guaranteed. In addition, by providing the air duct shell 61 and the heating pipe cover 62, the heating pipe 63 can be further isolated from the outside, and the adverse influence of the heat of the heating pipe 63 on other components of the cooking device 1 can be effectively prevented, to reduce the failure rate of the cooking device 1.

In addition, as shown in FIG. 3, the heating assembly 60 further includes a heat dissipation fan 66, which is arranged between the air duct shell 61 and the heating pipe cover 62, and which is sleeved over the driving shaft of the driving member 64. The heat dissipation fan 66 rotates synchronously with the driving shaft of the driving member 64, and the heat dissipation fan 66 can dissipate heat from the driving member 64 during rotation, to prevent the adverse influence of the heat on the driving member 64 and reducing the failure rate of the driving member 64.

In addition, in some examples of this embodiment, the driving member 64 is a motor, which has a simple structure and a good driving effect, and which effectively ensures the driving effect on the fan blade 65, to improve the efficiency of air flow and further improving the cooking quality of the food.

Figure 4:
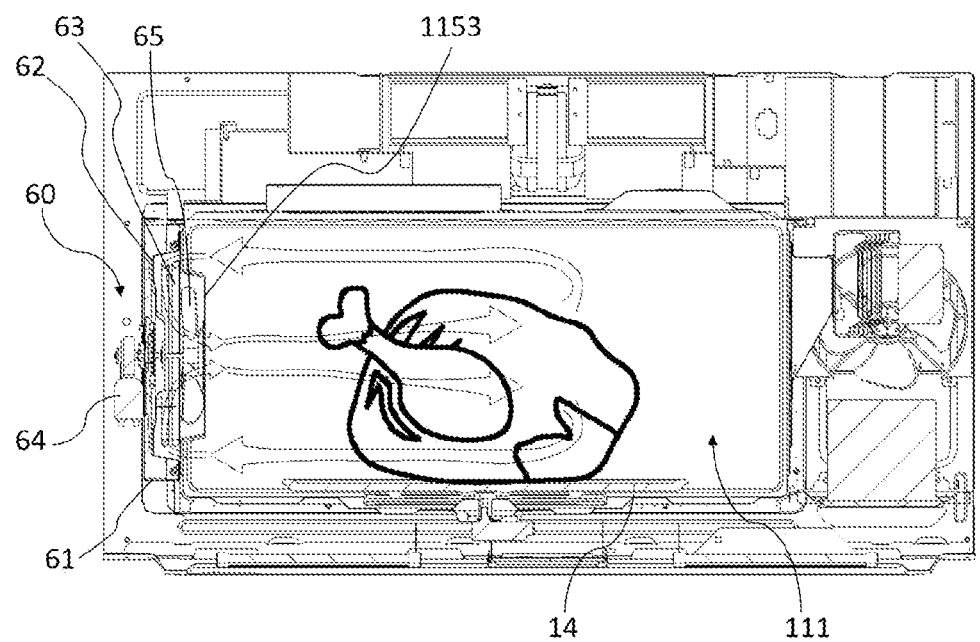
FIG. 4 is a schematic structural view of the cooking device when used for heating food in a case where the cabinet of the cooking device shown in FIG. 2 is in a first example (in which black hollow arrows in the figure indicate a direction of airflow)
Figure 5:
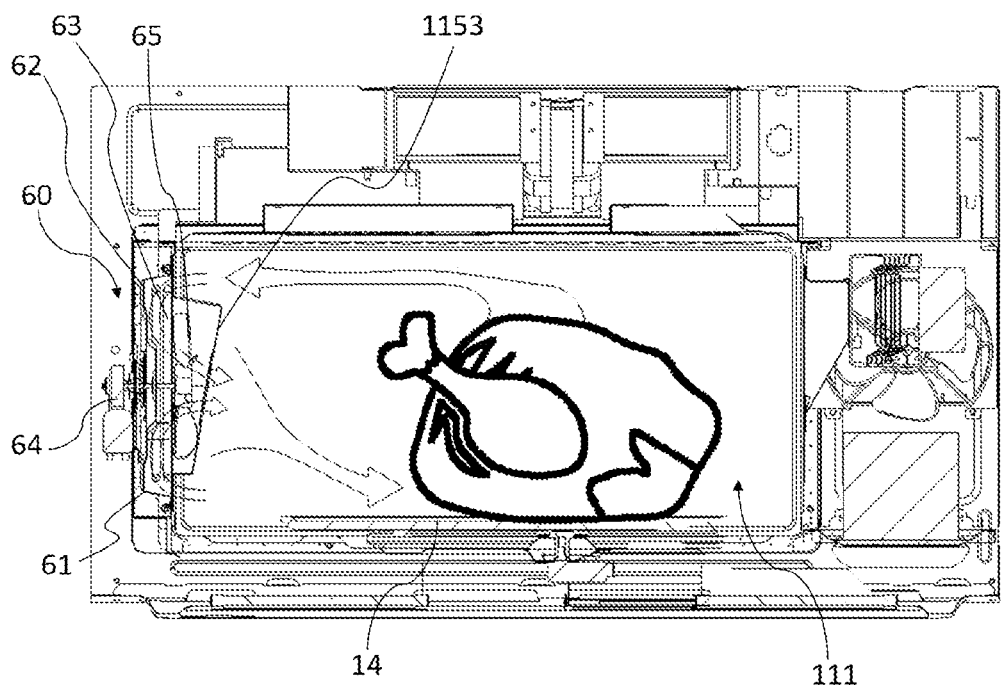
FIG. 5 is a schematic structural view of the cooking device when used for heating food in a case where the cabinet of the cooking device shown in FIG. 2 is in a second example (in which black hollow arrows in the figure indicate the direction of airflow)
Figure 6:
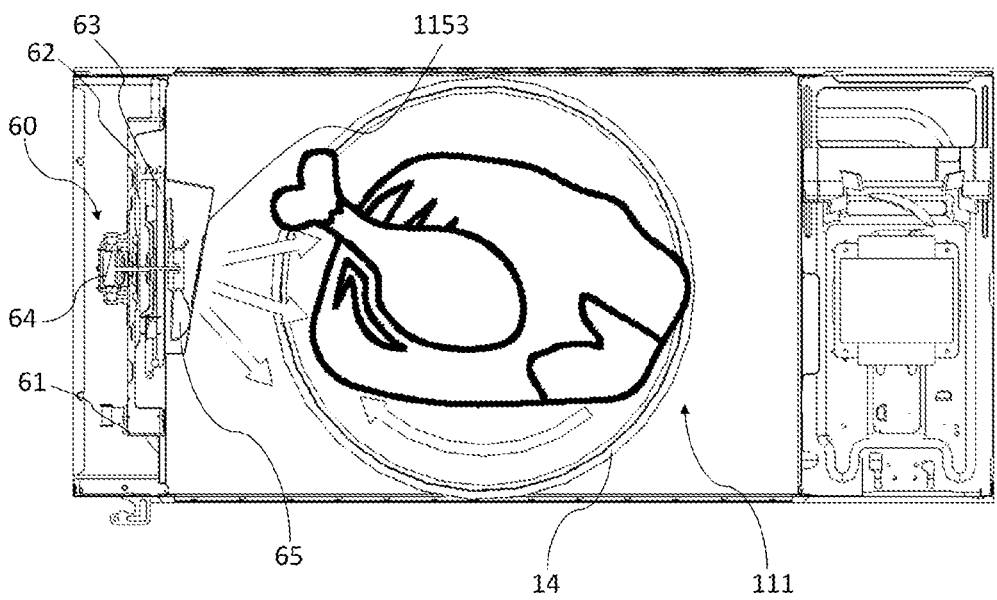
FIG. 6 is a schematic structural view of the cooking device when used for heating food in a case where the cabinet of the cooking device shown in FIG. 2 is in a third example (in which black hollow arrows in the figure indicate the direction of airflow)

Further, as shown in FIGS. 4 to 6, the heating pipe 63 fits with the heating pipe cover 62 and is arranged in a circumferential direction of the fan blade 65. In one embodiment, in some examples of this embodiment, the heating pipe 63 is located on the radially outer side of the fan blade 65, and the heating pipe 63 forms a closed annular structure in the circumferential direction on the radially outer side of the fan blade 65. After the heating assembly 60 is activated, the heating pipe 63 and the driving member 64 are both energized, and the driving member 64 drives the fan blade 65 to rotate. Under the action of the fan blade 65, the air in the cooking chamber 111 enters between the heating pipe cover 62 and the outer surface of the inner cavity 11 through the at least one air outlet hole 1152, and the air exchanges heat with the heating pipe 63 during the flow to form hot air. The formed hot air enters the cooking chamber 111 through the air inlet hole 1151 under the action of the fan blade 65 to achieve heating of the food in the cooking chamber 111. By arranging the heating pipe 63 in the circumferential direction of the fan blade 65, the uniformity of heating the air can be improved, and the uniformity of the hot air entering the cooking chamber 111 can be better, and the cooking effect of the food is further improved.

In some examples of this embodiment, as shown in FIG. 3, the side wall 115 of the inner cavity 11 is of a rectangular structure, the heating pipe 63 is of a closed rectangular frame structure, and the fan blade 65 is located inside the rectangular frame, which further ensures the uniformity of heating.

In some examples of this embodiment, the heating pipe 63 is of a closed circular frame structure, and the fan blade 65 is located in the circular frame structure. Since the fan blade 65 forms a circular air supply surface during the rotation of the fan blade 65, arranging the heating pipe 63 as a circular frame structure can further improve the heating efficiency of the air.

In one embodiment, the fan blade 65 is an axial flow fan blade. By arranging the fan blade 65 as an axial flow fan blade, when the driving member 64 drives the fan blade 65 to rotate, the air in the cooking chamber 111 enters the hot air assembly through the air outlet hole 1152 under the action of the fan blade 65. The air entering the hot air assembly is collected from the radially outer side of the fan blade 65 toward the axial direction of the fan blade 65 and is sent out in the axial direction of the fan blade 65. During the process of collecting the air in the axial direction of the fan blade 65, the air passes through the heating pipe 63. When passing through the heating pipe 63, the air is heated, and the air reaching the axis position of the fan blade 65 is hot air, which is then sent out in the axial direction of the fan blade 65. The axial direction of the fan blade 65 is set corresponding to the air inlet hole 1151, and the hot air effectively enters the cooking chamber 111 to achieve heating and cooking of the food. By configuring the fan blade 65 as an axial flow fan blade, hot air can be effectively supplied to the middle position of the cooking chamber 111, and the cooking quality of the food in the cooking chamber 111 is effectively improved.

Further, as shown in FIG. 3, the air inlet hole 1151 and at least one air outlet hole 1152 are arranged spaced apart on the side wall 115 of the cooking chamber 111, and the air inlet hole 1151 is located in the middle of the side wall 115. In one embodiment, the air inlet hole 1151 is arranged in the middle of the side wall 115 of the inner cavity 11, and the at least one air outlet hole 1152 is located on the same side wall 115 of the inner cavity 11 as the air inlet hole 1151 and is arranged spaced apart from the air inlet hole 1151. On one hand, such an arrangement enables air to circulate in the hot air assembly and the cooking chamber 111, and the hot wind formed by the flow of hot air can be used to heat the food in the cooking chamber 111; on the other hand, the coverage range of the hot air in the cooking chamber 111 can be ensured, and the cooking quality of the food is further improved.

Further, as shown in FIG. 3 to FIG. 6, the side wall 115 is formed with a raised structure with an air outflow end face 1153 on a side facing the cooking chamber 111, the fan blade 65 is arranged corresponding to the raised structure, and the air inlet hole 1151 is provided on the air outflow end face 1153. In one embodiment, the side wall 115 of the inner cavity 11 is formed with a raised structure arched from its outer surface to its inner surface. One side of the raised structure is a concave structure (located on the side of the outer surface of the inner cavity 11), and the other side of the raised structure is a convex structure (located on the inner surface of the inner cavity 11, that is, the side of the cooking chamber 111). The fan blade 65 is arranged in the concave structure, and the air inlet hole 1151 is provided on the air outflow end face 1153 of the raised structure. When the driving member 64 drives the fan blade 65 to rotate, the air in the cooking chamber 111 enters the heating assembly 60 through the at least one air outlet hole 1152 on the side wall 115 of the inner cavity 11, and is heated by the heating pipe 63 during the flow of air. The heated hot air is collected to the axis position of the axial flow fan blade, and enters the cooking chamber 111 through the air inlet hole 1151 along the axis of the fan blade 65. By arranging the fan blade 65 in the raised structure, the raised structure assists in the collection of hot air, which improves the collection effect of hot air, further ensures the stability of the temperature of the hot air entering the cooking chamber 111, and effectively improves the cooking quality of food.

It should be pointed out that the size of the raised structure can accommodate the fan blade 65, that is, the fan blade 65 will not be interfered by the raised structure during the rotation process, to ensure the effective circulation of air and effectively improving the cooking quality of the food.

In addition, the raised structure may be an integral structure with the side wall 115 of the inner cavity 11 (as shown in FIG. 3), or may be a separate structure from the side wall 115 of the inner cavity 11. In a case where the raised structure is an integral structure with the side wall 115 of the inner cavity 11, the two are manufactured by stamping (both are metal parts), to improve the convenience during the machining. In a case where the raised structure is a separate structure from the side wall 115 of the inner cavity 11, the two (both are metal parts) are connected and fixed by bonding, riveting or welding, etc., to reduce the manufacturing cost of the product.

In some examples of this embodiment, as shown in FIG. 4, the air outflow end face 1153 is perpendicular to the bottom surface of the cooking chamber 111. When the hot air enters the interior of the cooking chamber 111 through the air inlet hole 1151 on the air outflow end face 1153, the hot air is parallel to the bottom surface of the cooking chamber 111. The hot air is directly sprayed to the food, and the food is heated and cooked by means of heat exchange. This structure is simple, which facilitates machining and manufacturing, and resulting in a low manufacturing cost.

In some examples of this embodiment, as shown in FIG. 5, the air outflow end face 1153 is inclinedly arranged in a direction toward the bottom surface of the cooking chamber 111. By arranging the air outflow end face 1153 toward the bottom surface of the cooking chamber 111, under the action of the heating assembly 60, the hot air is sprayed toward the bottom of the cooking chamber 111 through the air inlet hole 1151 on the air outflow end face 1153, and first heating the bottom of the food; with the rise of the hot air, the food is heated from bottom to top, which further makes the food heated evenly and stably, and the cooking quality of the food is further improved.

It should be understood that the bottom of the food usually abuts against a support structure (a tray or a bracket, etc.), and the heating effect thereof is poor. By arranging the air outflow end face 1153 toward the bottom surface of the cooking chamber 111, the heating intensity of the bottom of the food can be improved, and the bottom of the food can be heated quickly to avoid deteriorated cooking quality caused by uneven heating of the food.

In some examples of this embodiment, as shown in FIG. 6, the air outflow end face 1153 is inclinedly arranged facing a rotational direction of the food in the cooking chamber 111. The cabinet 10 of the cooking device 1 generally further includes a turntable 14 arranged in the cooking chamber 111. The turntable 14 can rotate in the cooking chamber 111 and is used for placing the food. During the cooking of the food, the turntable 14 drives the food in the cooking chamber 111 to rotate and the food is heated evenly. By arranging the air outflow end face 1153 toward the rotational direction of the food, the hot air entering the cooking chamber 111 through the air inlet hole 1151 on the air outflow end face 1153 can be effectively sprayed to the food, which further ensures the heating of the food, and the heating uniformity of the food is improved, to improve the cooking quality of the food.

Further, as shown in FIG. 3, the number of the air outlet hole 1152 is plural, and air outlet holes 1152 are arranged at intervals around the air inlet hole 1151. In one embodiment, the air inlet hole 1151 is located on the side wall 115 of the inner cavity 11 and arranged corresponding to the middle of the cooking chamber 111, and air outlet holes 1152 are arranged at intervals in a circumferential direction surrounding the air inlet hole 1151. After the heating assembly 60 is activated, the air in the cooking chamber 111 enters the heating assembly 60 through air outlet holes 1152, and the air entering the heating assembly 60 is heated and then enters the cooking chamber 111 through the air inlet hole 1151. The arrangement of air outlet holes 1152 ensures that the air in the cooking chamber 111 is blown out uniformly, which further improves the stability and uniformity of the flow field formed by the hot air in the cooking chamber 111, and the cooking effect of the food is further improved.

Further, as shown in FIG. 1, the cooking device 1 further includes a fume exhaust duct 40 and a fan assembly 30, and the fan assembly 30 is arranged in the fume exhaust duct 40. In one embodiment, the fan assembly 30 of the cooking device 1 is arranged in the fume exhaust duct 40. When the cooking device 1 is used for cooking, the fan assembly 30 is activated, and the oil fume generated during the cooking process is discharged through the fume exhaust duct 40, thus preventing the whole cooking process from the intrusion of oil fume, and effectively improving the user experience.

Further, as shown in FIG. 1, the cooking device 1 further includes an installation bracket 20, the cabinet 10 is detachably arranged on the installation bracket 20, and the fume exhaust duct 40 is arranged in the cabinet 10 or in the installation bracket 20. In one embodiment, the installation bracket 20 is arranged on the wall 2, the cabinet 10 is arranged on the installation bracket 20, and the cabinet 10 fits with the installation bracket 20 in a detachable manner. The fume exhaust duct 40 is arranged in the installation bracket 20 or in the cabinet 10. By providing the installation bracket 20, the disassembly and assembly of the cabinet 10 is facilitated, and the convenience in the assembly and maintenance process of the cooking device 1 is effectively improved; in addition, by arranging the fume exhaust duct 40 in the cabinet 10 or in the installation bracket 20, the structure is made more compact, and the space required during the installation of the cooking device 1 is effectively reduced.

Further, as shown in FIG. 1, a stove 50 is arranged below the cabinet 10 of the cooking device 1, and an inlet of the fume exhaust duct 40 is arranged close to the stove 50. In one embodiment, the stove 50 and the cabinet 10 are spaced apart up-and-down, and the cabinet 10 is suspended above the stove 50 by the installation bracket 20. When the stove 50 is cooking the food, the oil fume and/or water vapor generated during the cooking process enters the fume exhaust duct 40 through the inlet of the fume exhaust duct 40 under the action of the fan assembly 30, and is discharged collectively, which further avoids the oil fume generated during the cooking process and further improves the user experience.

In an embodiment of the present application, as shown in FIG. 1 and FIGS. 7 to 9, a cooking device 1 is proposed according to this embodiment. The cooking device 1 includes a cabinet 10. The cabinet includes an inner cavity 11, a first heating assembly 601 and a second heating assembly 602. The inner cavity 11 is provided with a cooking chamber 111, as well as a first side wall 116 and a second side wall 117 arranged opposite to each other. The first side wall 116 is provided with a first ventilation structure 1161, and the second side wall 117 is provided with a second ventilation structure 1171. The first heating assembly 601 is arranged outside the inner cavity 11 and arranged corresponding to the first ventilation structure 1161, and is configured to circularly heat the air in the cooking chamber 111; and the second heating assembly 602 is arranged outside the inner cavity 11 and arranged corresponding to the second ventilation structure 1171, and is configured to circularly heat the air in the cooking chamber 111.

Figure 7:
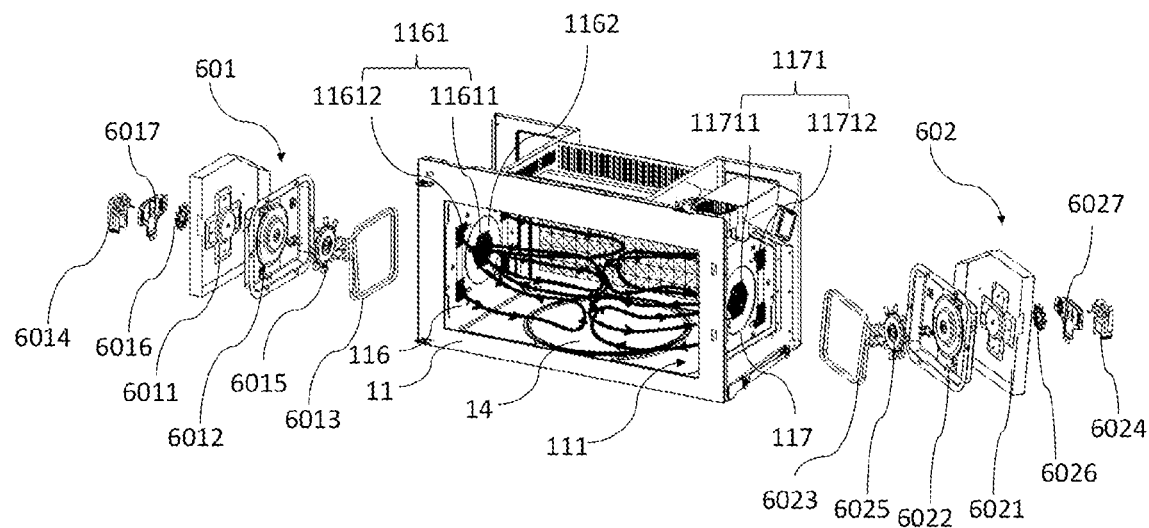
FIG. 7 is a schematic exploded structural view when the cabinet of the cooking device shown in FIG. 2 is in a fourth example (in which black solid-line arrows in the figure indicate the direction of airflow)
Figure 8:
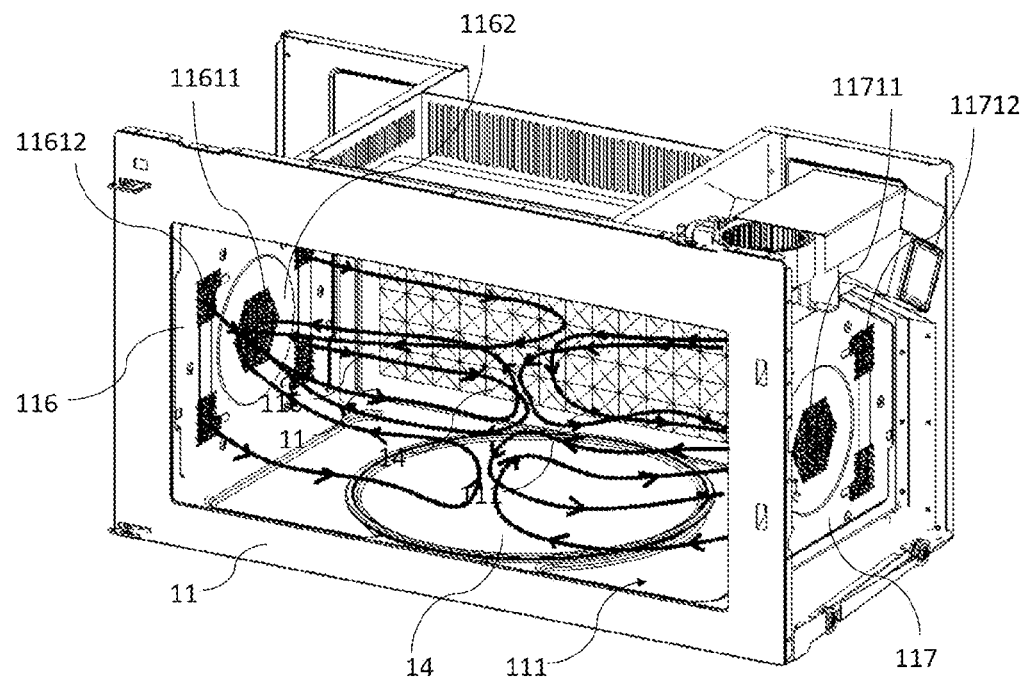
FIG. 8 is a schematic structural view of an inner cavity shown in FIG. 7 (in which black solid-line arrows in the figure indicate the direction of airflow)

In one embodiment, as shown in FIGS. 7 and 8, the first side wall 116 and the second side wall 117 of the cooking chamber 111 are arranged opposite to each other, the first heating assembly 601 is arranged outside the first side wall 116 and arranged corresponding to the first ventilation structure 1161, and the second heating assembly 602 is arranged outside the second side wall 117 and arranged corresponding to the second ventilation structure 1171. When heating the food in the cooking chamber 111, both the first heating assembly 601 and the second heating assembly 602 are activated, in which the first heating assembly 601 circularly heats the air in the cooking chamber 111 on the side of the first side wall 116, and the second heating assembly 602 circularly heats the air in the cooking chamber 111 on the side of the second side wall 117. By circularly heating the air in the cooking chamber 111 on two opposite sides of the cooking chamber 111 respectively, a convection structure is formed on the two opposite sides of the food, and the food in the cooking chamber 111 is heated evenly on both sides, which improves the cooking quality of the food.

It should be understood that the first heating assembly 601 communicates with the cooking chamber 111 through the first ventilation structure 1161, and the second heating assembly 602 communicates with the cooking chamber 111 through the second ventilation structure 1171. By using the first ventilation structure 1161 and the second ventilation structure 1171, outflow and inflow of air in the cooking chamber 111 is effectively realized; that is, the circulation of the air in the cooking chamber 111 is effectively realized, and hot wind can be formed to heat the food in the cooking chamber 111.

In addition, the circular heating of the air in the cooking chamber 111 by the first heating assembly 601 means that under the action of the first heating assembly 601, the air in the cooking chamber 111 leaves the cooking chamber 111 through the first ventilation structure 1161 and enters the first heating assembly 601, which heats the air entering the first heating assembly 601; then the heated air is sent into the cooking chamber 111 through the first ventilation structure 1161 to heat the food through heat exchange. The circular heating of the air in the cooking chamber 111 by the second heating assembly 602 follows the same principle as the circular heating of the air in the cooking chamber 111 by the first heating assembly 601. For details, reference may be made to the process of the circular heating of the air in the cooking chamber 111 by the first heating assembly 601, and a repeated description is omitted in the present application.

It should be noted that in some examples of this embodiment, as shown in FIGS. 7 and 8, the first side wall 116 is the left side wall of the inner cavity 11 (the side wall of the inner cavity 11 that is located on the left side of the cooking device 1), the second side wall 117 is the right side wall of the inner cavity 11 (the side wall of the inner cavity 11 that is located on the right side of the cooking device 1), and the first side wall 116 and the second side wall 117 are usually arranged in parallel. The first heating assembly 601 is arranged corresponding to the first ventilation structure 1161 of the first side wall 116, and the second heating assembly 602 is arranged corresponding to the second ventilation structure 1171 of the second side wall 117, and hot air convection can be formed on the opposite two sides of the cooking chamber 111; as such, the food located in the cooking chamber 111 is heated more evenly, which further improves the cooking quality of the food.

It is further understood that as shown in FIG. 7, the first ventilation structure 1161 includes a first air inlet hole 11611 and at least one first air outlet hole 11612. The first air inlet hole 11611 is located in the middle of the first side wall 116, and the first heating assembly 601 is configured to suck out the air in the cooking chamber 111 from the at least one first air outlet hole 11612, and is configured to heat the sucked-out air and then send it into the cooking chamber 111 through the first air inlet hole 11611. In one embodiment, when the cooking device 1 is heating the food, the food is usually placed in the middle of the cooking chamber 111. After the first heating assembly 601 is activated, under the action of the first heating assembly 601, the air in the cooking chamber 111 is sucked out through the at least one first air outlet hole 11612 and enters the first heating assembly 601; the first heating assembly 601 heats the incoming air and sends the hot air into the cooking chamber 111 through the first air inlet hole 11611. The hot air entering the cooking chamber 111 heats the food for cooking. Since the first air inlet hole 11611 is arranged in the middle of the first side wall 116, the hot air is directly blown toward the middle of the food after entering the cooking chamber 111, which improves a heating rate of the middle of the food, and the food is heated evenly and the cooking quality of the food is improved.

It should be understood that when the food is placed in the cooking chamber 111, the middle of the food is basically located in the middle of the cooking chamber 111. The food has a volume, and the density of the middle of the food is relatively high. By arranging the first air outlet hole 11612 in the middle of the first side wall 116, the first air outlet hole 11612 can be arranged corresponding to the middle of the cooking chamber 111, and the hot air is directly blown toward the middle of the food after entering the cooking chamber 111, to first heat the middle of the food; the hot air after heating the middle of the food has a decreased temperature and flows along the surface of the food; finally, it leaves the cooking chamber 111 from the at least one first air outlet hole 11612 and enters the first heating assembly 601 again, to be heated by the heating assembly again.

It should be pointed out that the first air inlet hole 11611 and the at least one first air outlet hole 11612 are both arranged on the first side wall 116, in which the first air inlet hole 11611 is located in the middle of the first side wall 116, and the at least one first air outlet hole 11612 is arranged spaced apart from the first air inlet hole 11611, that is, the at least one first air outlet hole 11612 is arranged offset from the middle of the first side wall 116. By adjusting the distance between the at least one first air outlet hole 11612 and the first air inlet hole 11611, the hot air flow field in the cooking chamber 111 can be adjusted to further improve the uniformity of heating the food.

In addition, in some examples of this embodiment, the first air inlet hole 11611 is of a first mesh structure, which can increase the amount of air entering the cooking chamber 111, to increase the heating rate of the food. The at least one first air outlet hole 11612 is of a second mesh structure, which can increase the air blowing-out rate of the cooking chamber 111, and the air circulation rate is increased, and the cooking efficiency of the food is further improved.

In some examples of this embodiment, the first air inlet hole 11611 is a first grille, and the at least one first air outlet hole 11612 is a second grille. By arranging the first air inlet hole 11611 as a first grille and arranging the first air outlet hole 11612 as a second grille, the air blow-in and blow-out area is further increased, and the flowing speed of the air is improved. In addition, the first grille can also be provided with a first driving mechanism, and the second grille can also be provided with a second driving mechanism, in which the first driving mechanism is configured to adjust the angle of the first grille, and the second driving mechanism is configured to adjust the angle of the second grille, to realize the adjustment of the air flow direction, and the cooking device 1 can meet the cooking requirements of different foods.

Further, as shown in FIG. 7, the first heating assembly 601 includes a first air duct shell 6011, and the first air duct shell 6011 is arranged outside the first side wall 116 and forms a first hot air cavity with the first side wall 116. Both the first air inlet hole 11611 and the at least one first air outlet hole 11612 communicate with the first hot air cavity. In one embodiment, the first air duct shell 6011 is arranged outside the first side wall 116, and the first air duct shell 6011 cooperates with the outer surface of the first side wall 116. The first air duct shell 6011 and the outer surface of the first side wall 116 enclose a first hot air cavity, and the first hot air cavity communicates with the cooking chamber 111 through the first air inlet hole 11611 and the at least one first air outlet hole 11612 respectively. When the cooking device 1 is used to cook the food, under the action of the first heating assembly 601, the air inside the cooking chamber 111 enters the first hot air cavity through the at least one first air outlet hole 11612, and the air entering the first hot air cavity is heated by the first heating assembly 601 to form hot air; the first heating assembly 601 sends the hot air into the cooking chamber 111 through the first air inlet hole 11611, and the hot air is used to cook the food. By arranging the first air duct shell 6011, the air can circulate between the cooking chamber 111 and the first hot air cavity, and during the circulation process, the air is effectively heated, and the heating and cooking of the food is carried out effectively, and the cooking quality of the food is further ensured.

It should be understood that the first air duct shell 6011 is arranged outside the first side wall 116 and cooperates with the outer surface of the first side wall 116, to reduce the air flow path and reducing the heat loss of the hot air, and the cooking efficiency of the food is ensured, and energy consumption of the cooking device 1 is reduced.

It should be pointed out that the connection between the first air duct shell 6011 and the first side wall 116 is a detachable connection, and the detachable connection may be screwing, clamping, riveting, etc. In some examples of this embodiment, the first air duct shell 6011 and the outer surface of the first side wall 116 are connected and fixed by screws. By using screw connection and fixation for convenient assembly, the efficiency of assembly can be effectively improved and the production cost of the cooking device 1 can be reduced.

In addition, the inner cavity 11 is generally a rectangular cavity, the first side wall 116 of the inner cavity 11 is of a first rectangular structure, and the size of the first air duct shell 6011 is close to the size of the first side wall 116. A coverage area of the first hot air cavity formed between the first air duct shell and the first side wall 116 on the first side wall 116 is slightly smaller than the area of the first side wall 116, to increase the coverage area of the hot air in the cooking chamber 111 and further improving the cooking quality of the food.

Further, as shown in FIG. 7, the first heating assembly 601 further includes: a first heating pipe cover 6012, a first heating pipe 6013, a first driving member 6014 and a first fan blade 6015. The first heating pipe cover 6012, the first heating pipe 6013 and the first fan blade 6015 are all arranged in the first hot air cavity, and the first driving member 6014 is arranged outside the first hot air cavity and is drivingly connected to the first fan blade 6015. In one embodiment, the first air duct shell 6011 cooperates with the outer surface of the first side wall 116 and a first hot air cavity is formed therebetween. The first fan blade 6015, the first heating pipe 6013 and the first heating pipe cover 6012 are all arranged in the first hot air cavity. The first driving member 6014 is arranged outside the first hot air cavity, and a first driving shaft of the first driving member 6014 passes through the first air duct shell 6011 before being drivingly connected to the first fan blade 6015. When the first heating assembly 601 is activated, the first driving member 6014 drives the first fan blade 6015 to rotate, and the first heating pipe 6013 is energized to generate heat. Under the action of the first fan blade 6015, the air in the cooking chamber 111 enters the first hot air cavity through the at least one first air outlet hole 11612. When the air entering the first hot air cavity flows to the position of the first heating pipe 6013, it exchanges heat with the first heating pipe 6013, and the air is heated to form hot air. Under the action of the first fan blade 6015, the hot air enters the cooking chamber 111 through the first air inlet hole 11611 to achieve heating and cooking of the food. The structure formed by the first driving member 6014 and the first fan blade 6015 effectively realizes the circulation of air between the cooking chamber 111 and the first hot air cavity, and at the same time, the first heating pipe 6013 is used to effectively realize the heating of the air, to realize the heating and cooking of the food.

It should be pointed out that the first heating pipe cover 6012 is a first half-shell structure with a first opening. When installing the first heating assembly 601, the first opening of the first heating pipe cover 6012 is abutted and fixed on the outer surface of the first side wall 116 (the first heating pipe cover 6012 and the outer surface of the first side wall 116 are connected and fixed by fixing screws and other components), and the first heating pipe cover 6012 and the outer surface of the first side wall 116 form a relatively closed first heating space. The first heating space communicates with the cooking chamber 111 through the first air inlet hole 11611 and the at least one first air outlet hole 11612 respectively. The first heating pipe 6013 and the first fan blade 6015 are both arranged in the first heating space, the first driving shaft of the first driving member 6014 passes through the first air duct shell 6011 and the first heating pipe cover 6012 before being connected to the first fan blade 6015, and the air in the cooking chamber 111 circulates between the first heating space and the cooking chamber 111. By providing the first heating pipe cover 6012, heat dissipation of the first heating pipe 6013 is further avoided, and the heating rate of the air is guaranteed. In addition, by providing the first air duct shell 6011 and the first heating pipe cover 6012, the first heating pipe 6013 can be further isolated from the outside, and the adverse influence of the heat of the first heating pipe 6013 on other components of the cooking device 1 can be effectively prevented, to reduce the failure rate of the cooking device 1.

In addition, as shown in FIG. 7, the first heating assembly 601 further includes a first heat dissipation fan 6016, which is arranged between the first air duct shell 6011 and the first heating pipe cover 6012, and which is sleeved over the first driving shaft of the first driving member 6014. The first heat dissipation fan 6016 rotates synchronously with the first driving shaft of the first driving member 6014, and the first heat dissipation fan 6016 can dissipate heat from the first driving member 6014 during rotation, to prevent the adverse influence of the heat on the first driving member 6014 and reducing the failure rate of the first driving member 6014.

In addition, in some examples of this embodiment, the first driving member 6014 is a motor, which has a simple structure and a good driving effect, and which effectively ensures the driving effect on the first fan blade 6015, to improve the efficiency of air flow and further improving the cooking quality of the food. At the same time, the first heating assembly 601 further includes a first fixing bracket 6017, and the first driving member 6014 is installed on the first air duct shell 6011 through the first fixing bracket 6017, to ensure the installation strength and stability of the first driving member 6014, and further ensuring the effective implementation of the heating in the cooking chamber 111 by the first heating assembly 601.

Further, as shown in FIG. 7, the first heating pipe 6013 fits with the first heating pipe cover 6012 and is arranged in a circumferential direction of the first fan blade 6015. In one embodiment, in some examples of this embodiment, the first heating pipe 6013 is located on the radially outer side of the first fan blade 6015, and the first heating pipe 6013 forms a closed annular structure in the circumferential direction on the radially outer side of the first fan blade 6015. When the first heating assembly 601 is activated, the first heating pipe 6013 and the first driving member 6014 are both energized, and the first driving member 6014 drives the first fan blade 6015 to rotate. Under the action of the first fan blade 6015, the air in the cooking chamber 111 enters between the first heating pipe cover 6012 and the outer surface of the first side wall 116 through the at least one first air outlet hole 11612, and the air exchanges heat with the first heating pipe 6013 during the flow to form hot air. The formed hot air enters the cooking chamber 111 through the first air inlet hole 11611 under the action of the first fan blade 6015 to achieve heating of the food in the cooking chamber 111. By arranging the first heating pipe 6013 in the circumferential direction of the first fan blade 6015, the uniformity of heating the air can be improved, and the uniformity of the hot air entering the cooking chamber 111 can be better, and the cooking effect of the food is further improved.

In some examples of this embodiment, the first side wall 116 is of a first rectangular structure, the first heating pipe 6013 is of a closed rectangular frame structure, and the first fan blade 6015 is located inside the rectangular frame, which further ensures the uniformity of heating.

In some examples of this embodiment, the first heating pipe 6013 is of a closed circular frame structure, and the first fan blade 6015 is located in the circular frame structure. Since the first fan blade 6015 forms a circular air supply surface during the rotation of the first fan blade 6015, arranging the first heating pipe 6013 as a circular frame structure can further improve the heating efficiency of the air.

In one embodiment, the first fan blade 6015 is a first axial flow fan blade. By arranging the first fan blade 6015 as a first axial flow fan blade, when the first driving member 6014 drives the first fan blade 6015 to rotate, the air in the cooking chamber 111 enters the first hot air assembly through the first air outlet hole 11612 under the action of the first fan blade 6015. The air entering the first hot air assembly is collected from the radially outer side of the first fan blade 6015 toward the axial direction of the first fan blade 6015 and is sent out in the axial direction of the first fan blade 6015. During the process of collecting the air in the axial direction of the first fan blade 6015, the air passes through the first heating pipe 6013. When passing through the first heating pipe 6013, the air is heated, and the air reaching the axis position of the first fan blade 6015 is hot air, which is then sent out in the axial direction of the first fan blade 6015. The axial direction of the first fan blade 6015 is set corresponding to the first air inlet hole 11611, and the hot air effectively enters the cooking chamber 111 to achieve heating and cooking of the food. By configuring the first fan blade 6015 as a first axial flow fan blade, hot air can be effectively supplied to the middle position of the cooking chamber 111, and the cooking quality of the food in the cooking chamber 111 is effectively improved.

Figure 9:
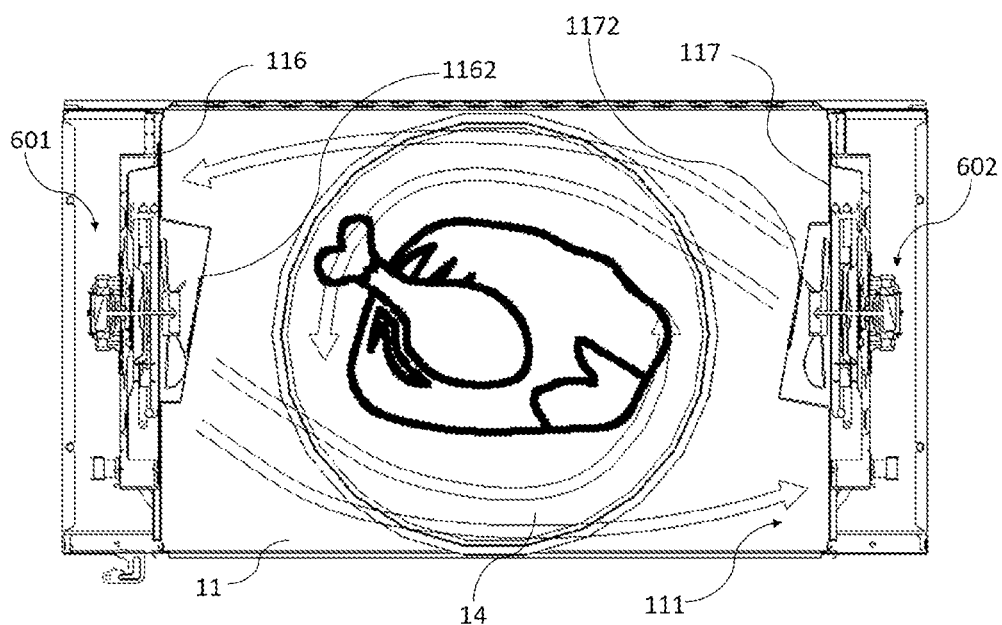
FIG. 9 is a schematic structural view when the cabinet of the cooking device shown in FIG. 2 is in a fifth example (in which black hollow arrows in the figure indicate the direction of airflow)

Further, as shown in FIG. 7 to FIG. 9, the first side wall 116 is formed with a first raised structure with a first air outflow end face 1162 on a side facing the cooking chamber 111, the first fan blade 6015 is arranged corresponding to the first raised structure, and the first air outlet hole 11612 is provided on the first air outflow end face 1162. In one embodiment, the first side wall 116 is formed with a first raised structure arched from its outer surface to its inner surface. One side of the first raised structure is a concave structure (located on the side of the outer surface of the inner cavity 11), and the other side of the first raised structure is a convex structure (located on the inner surface of the inner cavity 11, that is, the side of the cooking chamber 111). The first fan blade 6015 is arranged in the concave structure, and the first air inlet hole 11611 is provided on the first air outflow end face 1162 of the first raised structure. When the first driving member 6014 drives the first fan blade 6015 to rotate, the air in the cooking chamber 111 enters the first heating assembly 601 through the at least one first air outlet hole 11612 on the first side wall 116, and is heated by the first heating pipe 6013 during the flow of air. The heated hot air is collected to the axis position of the first axial flow fan blade, and enters the cooking chamber 111 through the first air inlet hole 11611 along the axis of the first fan blade 6015. By arranging the first fan blade 6015 in the first raised structure, the first raised structure assists in the collection of hot air, which improves the collection effect of hot air, further ensures the stability of the temperature of the hot air entering the cooking chamber 111, and effectively improves the cooking quality of food.

It should be pointed out that the size of the first raised structure can accommodate the first fan blade 6015, that is, the first fan blade 6015 will not be interfered by the first raised structure during the rotation process, to ensure the effective circulation of air and effectively improving the cooking quality of the food.

In addition, the first raised structure may be an integral structure with the first side wall 116, or may be a separate structure from the first side wall 116. In a case where the first raised structure is an integral structure with the first side wall 116, the two are manufactured by stamping (both are metal parts), to improve the convenience during the machining. In a case where the first raised structure is a separate structure from the first side wall 116, the two (both are metal parts) are connected and fixed by bonding, riveting or welding, etc., to reduce the manufacturing cost of the product.

Further, as shown in FIG. 7 to FIG. 9, the second ventilation structure 1171 includes a second air inlet hole 11712 and at least one second air outlet hole 11711. The second air inlet hole 11712 is located in the middle of the second side wall 117, and the second heating assembly 602 is configured to suck out the air in the cooking chamber 111 from the at least one second air outlet hole 11711, and is configured to heat the sucked-out air and then send it into the cooking chamber 111 through the second air inlet hole 11712. In one embodiment, when the cooking device 1 is heating the food, the food is usually placed in the middle of the cooking chamber 111. After the second heating assembly 602 is activated, under the action of the second heating assembly 602, the air in the cooking chamber 111 is sucked out through the at least one second air outlet hole 11711 and enters the second heating assembly 602; the second heating assembly 602 heats the incoming air and sends the hot air into the cooking chamber 111 through the second air inlet hole 11712. The hot air entering the cooking chamber 111 heats the food for cooking. Since the second air inlet hole 11712 is arranged in the middle of the second side wall 117, the hot air is directly blown toward the middle of the food after entering the cooking chamber 111, which improves a heating rate of the middle of the food, and the food is heated evenly and the cooking quality of the food is improved.

It should be understood that as shown in FIG. 7, by arranging the second air outlet hole 11711 in the middle of the second side wall 117, the second air outlet hole 11711 can be arranged corresponding to the middle of the cooking chamber 111, and the hot air is directly blown toward the middle of the food after entering the cooking chamber 111, to first heat the middle of the food; the hot air after heating the middle of the food has a decreased temperature and flows along the surface of the food; finally, it leaves the cooking chamber 111 from the at least one second air outlet hole 11711 and enters the second heating assembly 602 again, to be heated by the heating assembly again.

It should be pointed out that the second air inlet hole 11712 and the at least one second air outlet hole 11711 are both arranged on the second side wall 117, in which the second air inlet hole 11712 is located in the middle of the second side wall 117, and the at least one second air outlet hole 11711 is arranged spaced apart from the second air inlet hole 11712, that is, the at least one second air outlet hole 11711 is arranged offset from the middle of the first side wall 116. By adjusting the distance between the at least one second air outlet hole 11711 and the second air inlet hole 11712, the hot air flow field in the cooking chamber 111 can be adjusted to further improve the uniformity of heating the food.

In addition, in some examples of this embodiment, the second air inlet hole 11712 is of a third mesh structure, which can increase the amount of air entering the cooking chamber 111, to increase the heating rate of the food. The at least one second air outlet hole 11711 is of a fourth mesh structure, which can increase the air blowing-out rate of the cooking chamber 111, and the air circulation rate is increased, and the cooking efficiency of the food is further improved.

In some examples of this embodiment, the second air inlet hole 11712 is a third grille, and the at least one second air outlet hole 11711 is a fourth grille. By arranging the second air inlet hole 11712 as a third grille and arranging the second air outlet hole 11711 as a fourth grille, the air blow-in and blow-out area is further increased, and the flowing speed of the air is improved. In addition, the third grille can also be provided with a third driving mechanism, and the fourth grille can also be provided with a fourth driving mechanism, in which the third driving mechanism is configured to adjust the angle of the third grille, and the fourth driving mechanism is configured to adjust the angle of the fourth grille, to realize the adjustment of the air flow direction, and the cooking device 1 can meet the cooking requirements of different foods.

Further, as shown in FIG. 7 to FIG. 9, the second heating assembly 602 includes a second air duct shell 6021, and the second air duct shell 6021 is arranged outside the second side wall 117 and forms a second hot air cavity with the second side wall 117. Both the second air inlet hole 11712 and the at least one second air outlet hole 11711 communicate with the second hot air cavity. In one embodiment, the second air duct shell 6021 is arranged outside the second side wall 117, and the second air duct shell 6021 cooperates with the outer surface of the second side wall 117. The second air duct shell 6021 and the outer surface of the second side wall 117 enclose a second hot air cavity, and the second hot air cavity communicates with the cooking chamber 111 through the second air inlet hole 11712 and the at least one second air outlet hole 11711 respectively. When the cooking device 1 is used to cook the food, under the action of the second heating assembly 602, the air inside the cooking chamber 111 enters the second hot air cavity through the at least one second air outlet hole 11711, and the air entering the second hot air cavity is heated by the second heating assembly 602 to form hot air; the second heating assembly 602 sends the hot air into the cooking chamber 111 through the second air inlet hole 11712, and the hot air is used to cook the food. By arranging the second air duct shell 6021, the air can circulate between the cooking chamber 111 and the second hot air cavity, and during the circulation process, the air is effectively heated, and the heating and cooking of the food is carried out effectively, and the cooking quality of the food is further ensured.

Further, as shown in FIG. 7 to FIG. 9, the second heating assembly 602 further includes: a second heating pipe cover 6022, a second heating pipe 6023, a second driving member 6024 and a second fan blade 6025. The second heating pipe cover 6022, the second heating pipe 6023 and the second fan blade 6025 are all arranged in the second hot air cavity, and the second driving member 6024 is arranged outside the second hot air cavity and is drivingly connected to the second fan blade 6025. In one embodiment, the second air duct shell 6021 cooperates with the outer surface of the second side wall 117 and a second hot air cavity is formed therebetween. The second fan blade 6025, the second heating pipe 6023 and the second heating pipe cover 6022 are all arranged in the second hot air cavity. The second driving member 6024 is arranged outside the second hot air cavity, and a second driving shaft of the second driving member 6024 passes through the second air duct shell 6021 before being drivingly connected to the second fan blade 6025. When the second heating assembly 602 is activated, the second driving member 6024 drives the second fan blade 6025 to rotate, and the second heating pipe 6023 is energized to generate heat. Under the action of the second fan blade 6025, the air in the cooking chamber 111 enters the second hot air cavity through the at least one second air outlet hole 11711. When the air entering the second hot air cavity flows to the position of the second heating pipe 6023, it exchanges heat with the second heating pipe 6023, and the air is heated to form hot air. Under the action of the second fan blade 6025, the hot air enters the cooking chamber 111 through the second air inlet hole 11712 to achieve heating and cooking of the food. The structure formed by the second driving member 6024 and the second fan blade 6025 effectively realizes the circulation of air between the cooking chamber 111 and the second hot air cavity, and at the same time, the second heating pipe 6023 is used to effectively realize the heating of the air, to realize the heating and cooking of the food.

It should be pointed out that the second heating pipe cover 6022 is a second half-shell structure with a second opening. When installing the second heating assembly 602, the second opening of the second heating pipe cover 6022 is abutted and fixed on the outer surface of the second side wall 117 (the second heating pipe cover 6022 and the outer surface of the second side wall 117 are connected and fixed by fixing screws and other components), and the second heating pipe cover 6022 and the outer surface of the second side wall 117 form a relatively closed second heating space. The second heating space communicates with the cooking chamber 111 through the second air inlet hole 11712 and the at least one second air outlet hole 11711 respectively. The second heating pipe 6023 and the second fan blade 6025 are both arranged in the second heating space, the second driving shaft of the second driving member 6024 passes through the second air duct shell 6021 and the second heating pipe cover 6022 before being connected to the second fan blade 6025, and the air in the cooking chamber 111 circulates between the second heating space and the cooking chamber 111. By providing the second heating pipe cover 6022, heat dissipation of the second heating pipe 6023 is further avoided, and the heating rate of the air is guaranteed. In addition, by providing the second air duct shell 6021 and the second heating pipe cover 6022, the second heating pipe 6023 can be further isolated from the outside, and the adverse influence of the heat of the second heating pipe 6023 on other components of the cooking device 1 can be effectively prevented, to reduce the failure rate of the cooking device 1.

In addition, the second heating assembly 602 further includes a second heat dissipation fan 6026, which is arranged between the second air duct shell 6021 and the second heating pipe cover 6022, and which is sleeved over the second driving shaft of the second driving member 6024. The second heat dissipation fan 6026 rotates synchronously with the second driving shaft of the second driving member 6024, and the second heat dissipation fan 6026 can dissipate heat from the second driving member 6024 during rotation, to prevent the adverse influence of the heat on the second driving member 6024 and reducing the failure rate of the second driving member 6024.

In addition, in some examples of this embodiment, the second driving member 6024 is a motor, which has a simple structure and a good driving effect, and which effectively ensures the driving effect on the second fan blade 6025, to improve the efficiency of air flow and further improving the cooking quality of the food. At the same time, the second heating assembly 602 further includes a second fixing bracket 6027, and the second driving member 6024 is installed on the second air duct shell 6021 through the second fixing bracket 6027, to ensure the installation strength and stability of the second driving member 6024, and further ensuring the effective implementation of the heating in the cooking chamber 111 by the second heating assembly 602.

Further, as shown in FIG. 7 to FIG. 9, the second heating pipe 6023 fits with the second heating pipe cover 6022 and is arranged in a circumferential direction of the second fan blade 6025. In one embodiment, in some examples of this embodiment, the second heating pipe 6023 is located on the radially outer side of the second fan blade 6025, and the second heating pipe 6023 forms a closed annular structure in the circumferential direction on the radially outer side of the second fan blade 6025. When the second heating assembly 602 is activated, the second heating pipe 6023 and the second driving member 6024 are both energized, and the second driving member 6024 drives the second fan blade 6025 to rotate. Under the action of the second fan blade 6025, the air in the cooking chamber 111 enters between the second heating pipe cover 6022 and the outer surface of the second side wall 117 through the at least one second air outlet hole 11711, and the air exchanges heat with the second heating pipe 6023 during the flow to form hot air. The formed hot air enters the cooking chamber 111 through the second air inlet hole 11712 under the action of the second fan blade 6025 to achieve heating of the food in the cooking chamber 111. By arranging the second heating pipe 6023 in the circumferential direction of the second fan blade 6025, the uniformity of heating the air can be improved, and the uniformity of the hot air entering the cooking chamber 111 can be better, and the cooking effect of the food is further improved.

In some examples of this embodiment, the second side wall 117 is of a second rectangular structure, the second heating pipe 6023 is of a closed rectangular frame structure, and the second fan blade 6025 is located inside the rectangular frame, which further ensures the uniformity of heating.

In some examples of this embodiment, the second heating pipe 6023 is of a closed circular frame structure, and the second fan blade 6025 is located in the circular frame structure. Since the second fan blade 6025 forms a circular air supply surface during the rotation of the second fan blade 6025, arranging the second heating pipe 6023 as a circular frame structure can further improve the heating efficiency of the air.

In one embodiment, the second fan blade 6025 is a second axial flow fan blade. By arranging the second fan blade 6025 as a second axial flow fan blade, when the second driving member 6024 drives the second fan blade 6025 to rotate, the air in the cooking chamber 111 enters the second hot air assembly through the second air outlet hole 11711 under the action of the second fan blade 6025. The air entering the second hot air assembly is collected from the radially outer side of the second fan blade 6025 toward the axial direction of the second fan blade 6025 and is sent out in the axial direction of the second fan blade 6025. During the process of collecting the air in the axial direction of the second fan blade 6025, the air passes through the second heating pipe 6023. When passing through the second heating pipe 6023, the air is heated, and the air reaching the axis position of the second fan blade 6025 is hot air, which is then sent out in the axial direction of the second fan blade 6025. The axial direction of the second fan blade 6025 is set corresponding to the second air inlet hole 11712, and the hot air effectively enters the cooking chamber 111 to achieve heating and cooking of the food. By configuring the second fan blade 6025 as a second axial flow fan blade, hot air can be effectively supplied to the middle position of the cooking chamber 111, and the cooking quality of the food in the cooking chamber 111 is effectively improved.

Further, as shown in FIG. 7 to FIG. 9, the second side wall 117 is formed with a second raised structure with a second air outflow end face 1172 on a side facing the cooking chamber 111, the second fan blade 6025 is arranged corresponding to the second raised structure, and the second air outlet hole 11711 is provided on the second air outflow end face 1172. In one embodiment, the second side wall 117 is formed with a second raised structure arched from its outer surface to its inner surface. One side of the second raised structure is a concave structure (located on the side of the outer surface of the inner cavity 11), and the other side of the second raised structure is a convex structure (located on the inner surface of the inner cavity 11, that is, the side of the cooking chamber 111). The second fan blade 6025 is arranged in the concave structure, and the second air inlet hole 11712 is provided on the second air outflow end face 1172 of the second raised structure. When the second driving member 6024 drives the second fan blade 6025 to rotate, the air in the cooking chamber 111 enters the second heating assembly 602 through the at least one second air outlet hole 11711 on the second side wall 117, and is heated by the second heating pipe 6023 during the flow of air. The heated hot air is collected to the axis position of the second axial flow fan blade, and enters the cooking chamber 111 through the second air inlet hole 11712 along the axis of the second fan blade 6025. By arranging the second fan blade 6025 in the second raised structure, the second raised structure assists in the collection of hot air, which improves the collection effect of hot air, further ensures the stability of the temperature of the hot air entering the cooking chamber 111, and effectively improves the cooking quality of food.

It should be pointed out that the size of the second raised structure can accommodate the second fan blade 6025, that is, the second fan blade 6025 will not be interfered by the second raised structure during the rotation process, to ensure the effective circulation of air and effectively improving the cooking quality of the food.

In addition, the second raised structure may be an integral structure with the second side wall 117, or may be a separate structure from the second side wall 117. In a case where the second raised structure is an integral structure with the second side wall 117, the two are manufactured by stamping (both are metal parts), to improve the convenience during the machining. In a case where the second raised structure is a separate structure from the second side wall 117, the two (both are metal parts) are connected and fixed by bonding, riveting or welding, etc., to reduce the manufacturing cost of the product.

In some examples of this embodiment, as shown in FIGS. 7 and 8, the second air outflow end face 1172 is parallel to the first air outflow end face 1162. The hot air formed by the first heating assembly 601 enters the cooking chamber 111 from the first side wall 116 and heats one side of the food, and the hot air formed by the second heating assembly 602 enters the cooking chamber 111 from the second side wall 117 and heats the other side of the food. Therefore, by arranging the first air outflow end face 1162 and the second air outflow end face 1172 in parallel, the food is heated uniformly and stably on both sides, to improve the cooking quality of the food.

It should be noted that as shown in FIG. 9, the first air outflow end face 1162 is inclined toward the side of the opening of the cooking chamber 111, and the second air outflow end face 1172 is inclined toward the side of the rear side wall of the cooking chamber 111. When the first heating assembly 601 and the second heating assembly 602 are activated at the same time, the first heating assembly 601 and the second heating assembly 602 can form a rotating heating airflow in the cooking chamber 111, and the food is heated more evenly, and the cooking quality of the food is further improved.

In addition, as shown in FIG. 9, the cabinet 10 of the cooking device 1 generally further includes a turntable 14 arranged in the cooking chamber 111. The turntable 14 can rotate in the cooking chamber 111 and is configured to place the food. During the cooking of the food, the turntable 14 drives the food to rotate in the cooking chamber 111, and the food is heated evenly. The rotational direction of the rotating airflow formed in the cooking chamber 111 by the first heating assembly 601 and the second heating assembly 602 is the same as the rotational direction of the food, and the food is heated and cooked during the rotation, and the heating uniformity of the food is further improved, to improve the cooking quality of the food.

In some examples of this embodiment, the first air outflow end face 1162 and the second air outflow end face 1172 may not be arranged parallel to each other; for example, the first air outflow end face 1162 and the second air outflow end face 1172 are both arranged toward the bottom surface of the cooking chamber 111, and the hot wind on both sides of the food is blown toward the bottom of the food, and the bottom position of the food can be quickly heated. As such, the food is heated evenly, and the cooking quality of the food is further improved.

Further, as shown in FIG. 1, the cooking device 1 further includes a fume exhaust duct 40 and a fan assembly 30, and the fan assembly 30 is arranged in the fume exhaust duct 40. In one embodiment, the fan assembly 30 of the cooking device 1 is arranged in the fume exhaust duct 40. When the cooking device 1 is used for cooking, the fan assembly 30 is activated, and the oil fume generated during the cooking process is discharged through the fume exhaust duct 40, thus preventing the whole cooking process from the intrusion of oil fume, and effectively improving the user experience.

Further, as shown in FIG. 1, the cooking device 1 further includes an installation bracket 20, the cabinet 10 is detachably arranged on the installation bracket 20, and the fume exhaust duct 40 is arranged in the cabinet 10 or in the installation bracket 20. In one embodiment, the installation bracket 20 is arranged on the wall 2, the cabinet 10 is arranged on the installation bracket 20, and the cabinet 10 fits with the installation bracket 20 in a detachable manner. The fume exhaust duct 40 is arranged in the installation bracket 20 or in the cabinet 10. By providing the installation bracket 20, the disassembly and assembly of the cabinet 10 is facilitated, and the convenience in the assembly and maintenance process of the cooking device 1 is effectively improved; in addition, by arranging the fume exhaust duct 40 in the cabinet 10 or in the installation bracket 20, the structure is made more compact, and the space required during the installation of the cooking device 1 is effectively reduced.

Further, as shown in FIG. 1, a stove 50 is arranged below the cabinet 10 of the cooking device 1, and an inlet of the fume exhaust duct 40 is arranged close to the stove 50. In one embodiment, the stove 50 and the cabinet 10 are spaced apart up-and-down, and the cabinet 10 is suspended above the stove 50 by the installation bracket 20. When the stove 50 is cooking the food, the oil fume and/or water vapor generated during the cooking process enters the fume exhaust duct 40 through the inlet of the fume exhaust duct 40 under the action of the fan assembly 30, and is discharged collectively, which further avoids the oil fume generated during the cooking process and further improves the user experience.

In an embodiment of the present application, as shown in FIG. 1 and FIG. 14 to FIG. 16, a cooking device 1 is proposed according to this embodiment. The cooking device 1 includes a cabinet 10 and a microwave generating assembly 70. The cabinet 10 includes an inner cavity 11 having a cooking chamber 111, the cooking chamber 111 is provided with an inclined plate 112 for forming the cooking chamber 111, and a magnetron 71 of the microwave generating assembly 70 is arranged on the inclined plate 112 and is located outside the cooking chamber 111.

In one embodiment, the inclined plate 112 for forming the cooking chamber 111 is located at the corner position of the cooking chamber 111. The magnetron 71 of the microwave generating assembly 70 is relatively large, and by arranging the magnetron 71 on the inclined plate 112 and locating it outside the cooking chamber 111, the space occupied by the magnetron 71 on the left or right side of the cooking device 1 is reduced. Under the premise of maintaining the outer sizes of the cooking device 1 unchanged, the cooking chamber 111 can be expanded outwardly on the original basis, to increase the internal volume of the cooking chamber 111, to improve the processing capability to the food.

It should be understood that when the user is facing the cooking device 1, a distance from the side of the cooking device 1 close to the user to the side of the cooking device 1 away from the user is a width of the cooking device 1, a distance from the user's left-hand side to the user's right-hand side is a length of the cooking device 1, and a distance from the side of the cooking device 1 close to the bottom surface to the side of the cooking device 1 away from the bottom surface is a height of the cooking device 1.

In the prior art, the microwave generating assembly 70 is located on the left or right side outside the inner cavity 11. In order to meet the installation requirements of the microwave generating assembly 70, a rectangular installation space is provided on the left or right side outside the inner cavity 11. The width and height of the installation space are consistent with the width and height of the cooking device 1. Under the premise of maintaining the overall size of the cooking device 1 unchanged, the existence of this installation space restricts the volume of the cooking chamber 111. The volume of the magnetron 71 is relatively large, and arranging the magnetron 71 of the microwave generating assembly 70 on the inclined plate 112 can reduce the volume of the installation space, and the volume of the cooking chamber 111 can be increased to a certain extent, to improve the processing capability of the cooking device 1 to the food.

Figure 14:
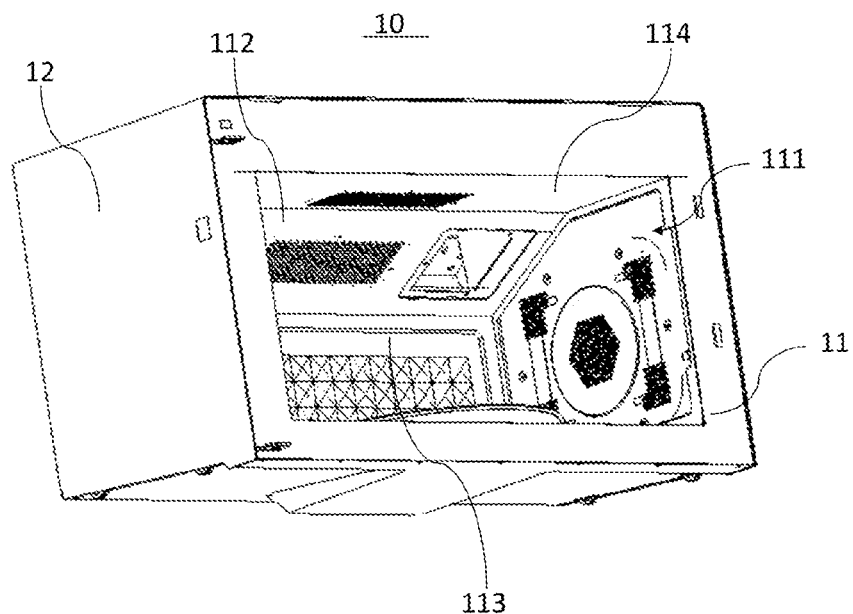
FIG. 14 is a schematic structural view when the cabinet of the cooking device shown in FIG. 2 is in an eighth example.

It is further understood that as shown in FIG. 14, the inner cavity 11 includes a rear side plate 113 and a top plate 114, and the top plate 114 is connected to the rear side plate 113 through the inclined plate 112. In one embodiment, the rear side plate 113 and the top plate 114 are respectively used to form the cooking chamber 111, and the rear side plate 113 is connected to the top plate 114 through the inclined plate 112; that is, the inclined plate 112 is arranged at a corner position above the rear of the cooking chamber 111. When installing the magnetron 71, the magnetron 71 is arranged outside the cooking chamber 111 and fixed to the inclined plate 112; that is, the magnetron 71 is installed at the corner position outside the cooking chamber 111, which further reduces the volume occupied when installing the magnetron 71, and the volume of the cooking chamber 111 can be effectively increased.

It should be understood that in the present application, the rear side plate 113 and the top plate 114 are arranged spaced apart and perpendicular to each other, and the two are connected and fixed by the inclined plate 112.

It should be pointed out that the inner cavity 11 further includes a bottom plate and two side walls, in which the two side walls are arranged in parallel and spaced apart on the left and right sides of the cooking chamber 111, and the bottom plate is arranged at the bottom of the cooking chamber 111 and is connected and fixed with the two side walls respectively. The rear side plate 113 is connected and fixed with the two side walls and the bottom plate respectively, the top plate 114 is connected and fixed with the two side walls respectively, and at the same time, the inclined plate 112 is also connected and fixed with the two side walls respectively. By splicing the bottom plate, the two side walls, the top plate 114, the rear side plate 113 and the inclined plate 112 with each other, the inner cavity 11 with an approximate rectangular structure is formed, and the cooking chamber 111 inside the inner cavity 11 has a consistent shape with the inner cavity 11, to ensure that the volume of the cooking chamber 111 is maximized, and the processing capability of the cooking device 1 to the food is effectively improved.

In addition, the rear side plate 113, the inclined plate 112 and the top plate 114 may be of a split structure or an integral structure. In a case where the rear side plate 113, the inclined plate 112 and the top plate 114 are of a split structure, they are machined by stamping (all the three are metal sheets), to improve the convenience during the machining. In a case where the rear side plate 113, the inclined plate 112 and the top plate 114 are of a split structure, the rear side plate 113, the inclined plate 112 and the top plate 114 are machined and manufactured respectively, are then connected and fixed by welding or riveting. The split machining has a low manufacturing cost, which effectively reduces the manufacturing cost of the cooking device 1.

Figure 16:
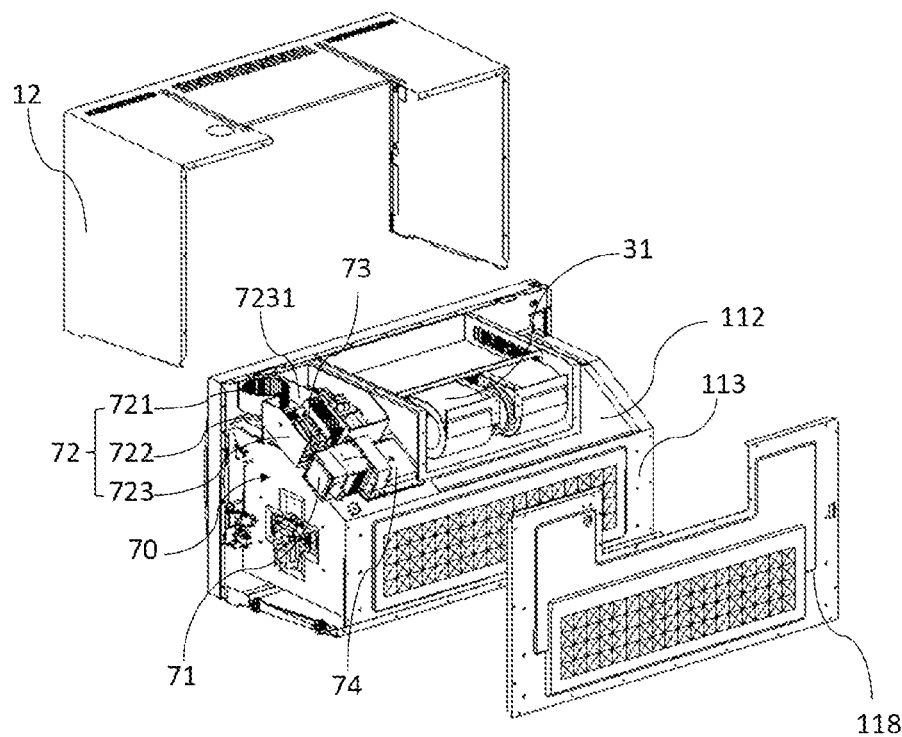
FIG. 16 is a schematic exploded structural view of the cabinet shown in FIG. 15.
Figure 17:
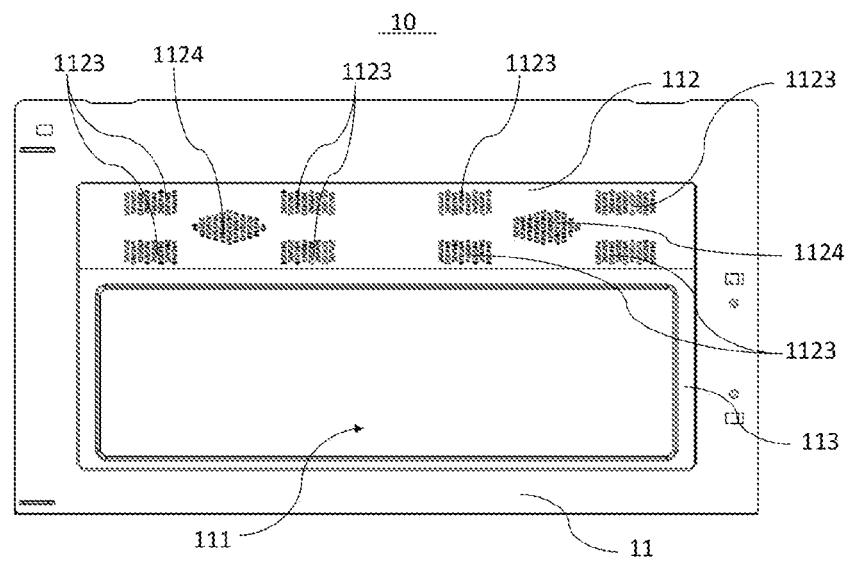
FIG. 17 is a schematic structural view when the cabinet of the cooking device shown in FIG. 2 is in a ninth example.

In some examples of this embodiment, as shown in FIG. 14 or FIG. 16, the inclined plate 112 is a flat plate-like structure, and a width of the flat plate structure (a distance of the inclined plate 112 between the top plate 114 and the rear side plate 113) is larger than a width of the magnetron 71. When the magnetron 71 is arranged on the inclined plate 112, the installation of the magnetron 71 only affects part of the space at the top of the rear side of the cooking chamber 111, and the volume of the cooking chamber 111 is effectively increased on the original basis.

In some examples of this embodiment, the inclined plate 112 includes a first plate body and a second plate body connected with each other at an obtuse angle, in which the first plate body is perpendicularly connected to the rear side plate 113 and is in parallel to the top plate 114, and the second plate body is connected to the top plate 114. In one embodiment, the first plate body and the second plate body are connected to each other, in which the first plate body is perpendicularly connected to the rear side plate 113, and the second plate body is connected to the top plate 114. When the magnetron 71 is installed on the inclined plate 112, by setting the included angle between the first plate body and the second plate body as an obtuse angle (located at the connection position outside the cooking chamber 111), the magnetron 71 can be accommodated in the space formed by the first plate body and the second plate body, and the influence of the magnetron 71 on the external space is reduced, and the overall space utilization of the cooking device 1 is effectively improved.

Figure 15:
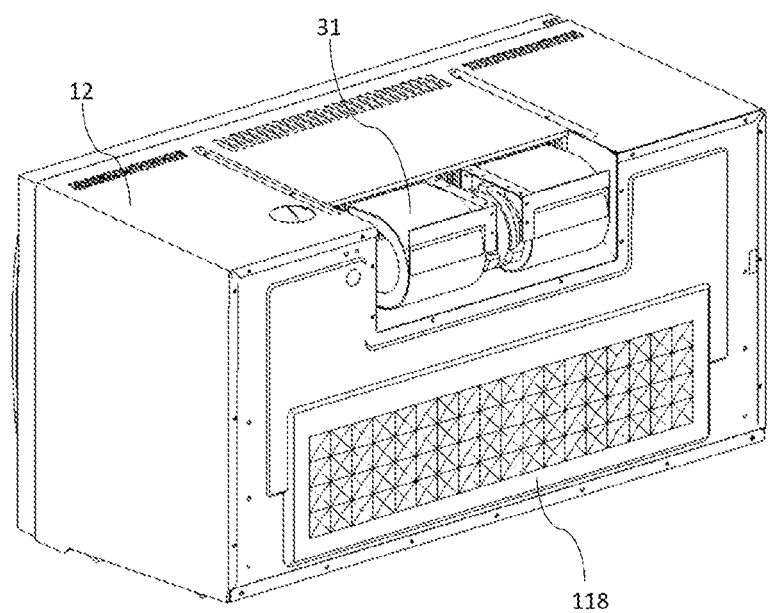
FIG. 15 is a schematic structural view of the cabinet shown in FIG. 14 when in another posture.

Further, as shown in FIG. 15 and FIG. 16, the cabinet 10 further includes a casing 12 with a receiving structure, the casing 12 is arranged outside the inner cavity 11, and the magnetron 71 is provided on the inclined plate 112 and arranged corresponding to the receiving structure. In one embodiment, the casing 12 is arranged outside the inner cavity 11, and the receiving structure is arranged corresponding to the inclined plate 112. When installing the magnetron 71, the magnetron 71 is installed on the inclined plate 112 and is arranged corresponding to the receiving structure of the casing 12, which further reduces the space waste caused during the installation of the magnetron 71, and the overall space utilization of the cooking device 1 is further improved, to increase the volume of the cooking chamber 111.

In one embodiment, the receiving structure is a right-angle structure formed in a direction away from the inclined plate 112. In one embodiment, the magnetron 71 is arranged between the inner cavity 1111 and the casing 12, and the position of the casing corresponding to the inclined plate 112 is the right-angle structure, which is the receiving structure. The right-angle structure and the inclined plate 112 together enclose an installation space. The magnetron 71 is located in the installation space and is arranged corresponding to the right-angle structure and the inclined plate 112 respectively, and at the same time of realizing the installation of the magnetron 71, the influence of the magnetron 71 on the volume of the cooking chamber 111 is reduced, and the volume of the cooking chamber 111 can be effectively increased, to improve the processing capability to the food.

In one embodiment, as shown in FIG. 14, the microwave generating assembly 70 further includes a waveguide 74, which is arranged on the inclined plate 112, and the magnetron 71 communicates with the cooking chamber 111 through the waveguide 74. The waveguide 74 is arranged on the inclined plate 112, and the magnetron 71 communicates with the interior of the cooking chamber 111 through the waveguide 74. When microwave heating of the food in the cooking chamber 111 is required, the magnetron 71 generates microwaves, and the microwaves enter the cooking chamber 111 through the waveguide 74, to realize heating and cooking of the food. By arranging the waveguide 74 on the inclined plate 112, on one hand, the path of microwave transmission can be shortened, and the cooking speed can be accelerated, and the cooking efficiency can be improved; on the other hand, the influence of the installation of the waveguide 74 on the volume of the cooking chamber 111 can be avoided, and the volume of the cooking chamber 111 can be further increased, to improve the processing capability to the food.

Further, as shown in FIG. 14, the microwave generating assembly 70 further includes a heat dissipation device 72 and a power device 73. The heat dissipation device 72 is arranged on the top plate 114, and the power device 73 is arranged between the magnetron 71 and the heat dissipation device 72. In one embodiment, the heat dissipation device 72 is arranged on the top plate 114, and the power device 73 is arranged between the magnetron 71 and the heat dissipation device 72. When the microwave generating assembly 70 is activated, the heat dissipation device 72 is used to dissipate heat from the magnetron 71 and the power device 73, to ensure a stable and efficient operation of the microwave generating assembly 70 and reducing the failure rate of the microwave generating assembly 70.

It should be pointed out that the power device 73 includes a transformer, a circuit board, a filter board and other components, and the power device 73 is arranged between the heat dissipation device 72 and the magnetron 71, which can make the overall structure more compact and reduce the space required for installation, and the overall space utilization of the cooking device 1 is improved.

Further, as shown in FIG. 14, the heat dissipation device 72 includes an impeller 721, a driving member 722 and an air guide member 723 having a heat dissipation air duct 7231. The impeller 721 is arranged in the heat dissipation air duct 7231 and is drivingly connected with the driving member 722. The power device 73 is arranged in the heat dissipation air duct 7231, and an air inlet of the heat dissipation air duct 7231 is arranged corresponding to the magnetron 71. In one embodiment, the driving member 722 is arranged on the top plate 114 of the inner cavity 11, the impeller 721 is drivingly connected with the driving member 722, and the air inlet of the heat dissipation air duct 7231 of the air guide member 723 is arranged corresponding to the position of the magnetron 71. An air outlet of the heat dissipation air duct 7231 of the air guide member 723 communicates with the outside, and the impeller 721 is located in the heat dissipation air duct 7231 of the air guide member 723. After the microwave generating assembly 70 is activated, the driving member 722 drives the impeller 721 to rotate in the heat dissipation air duct 7231, and air is sucked in through the air inlet of the heat dissipation air duct 7231, flows along the heat dissipation air duct 7231, and is finally discharged through the air outlet of the heat dissipation air duct 7231. When the air enters the heat dissipation air duct 7231 through the air inlet of the heat dissipation air duct 7231, the air exchanges heat with the magnetron 71, and the magnetron 71 is maintained under the safe working temperature. When the air flows in the heat dissipation air duct 7231, the air exchanges heat with the power device 73, and the power device 73 is maintained under the safe working temperature. Finally, the air after heat exchange is discharged. The overall structure of the heat dissipation device 72 is compact, and the space occupied during installation is small, which effectively improves the space utilization of the cooking device 1, and the volume of the cooking chamber 111 can be increased, to improve the processing capability to the food.

Further, as shown in FIG. 1, the cooking device 1 further includes a fume exhaust duct 40 and a fan assembly 30, and the fan assembly 30 is provided in the fume exhaust duct 40 and arranged corresponding to the inclined plate 112. In one embodiment, the fan assembly 30 of the cooking device 1 is arranged in the fume exhaust duct 40. When the cooking device 1 is used for cooking, the fan assembly 30 is activated, and the oil fume generated during the cooking process is discharged through the fume exhaust duct 40, thus preventing the whole cooking process from the intrusion of oil fume, and effectively improving the user experience.

It should be pointed out that the fan body 31 of the fan assembly 30 is arranged corresponding to the inclined plate 112, to avoid the influence of the fan body 31 on the cooking chamber 111, and the volume of the cooking chamber 111 is effectively increased.

In some examples of this embodiment, as shown in FIG. 16, the fume exhaust duct 40 is provided in the cabinet 10. The cabinet 10 further includes a rear plate 118, which is arranged spaced apart from the rear side plate 113 of the inner cavity 11. The rear plate 118 is connected and fixed to the casing, and the fume exhaust duct 40 is formed between the rear plate 118 and the rear side plate 113 of the inner cavity 11. The fan assembly 30 is located in the fume exhaust duct 40, and the fan body 31 of the fan assembly 30 is arranged corresponding to the inclined plate 112, and the cabinet 10 has the function of extracting oil fume, and at the same time, the influence on the volume of the cooking chamber 111 is reduced.

In some examples of this embodiment, as shown in FIG. 1, the cooking device 1 further includes an installation bracket 20, the cabinet 10 is detachably arranged on the installation bracket 20, and the fume exhaust duct 40 is arranged in the installation bracket 20. In one embodiment, the installation bracket 20 is arranged on the wall 2, the cabinet 10 is arranged on the installation bracket 20, and the cabinet 10 fits with the installation bracket 20 in a detachable manner. The fume exhaust duct 40 is arranged in the installation bracket 20. By providing the installation bracket 20, the disassembly and assembly of the cabinet 10 is facilitated, and the convenience in the assembly and maintenance process of the cooking device 1 is effectively improved; in addition, by arranging the fume exhaust duct 40 in the installation bracket 20, the influence of the fume exhaust duct 40 on the cooking chamber 111 is effectively avoided.

Further, as shown in FIG. 1, a stove 50 is arranged below the cabinet 10 of the cooking device 1, and an inlet of the fume exhaust duct 40 is arranged close to the stove 50. The stove 50 and the cabinet 10 are spaced apart up-and-down, and the cabinet 10 is suspended above the stove 50 by the installation bracket 20. When the stove 50 is cooking the food, the oil fume and/or water vapor generated during the cooking process enters the fume exhaust duct 40 through the inlet of the fume exhaust duct 40 under the action of the fan assembly 30, and is discharged collectively, which further avoids the oil fume generated during the cooking process and further improves the user experience.

In an embodiment of the present application, as shown in FIG. 1 and FIGS. 17 to 20, a cooking device 1 is proposed according to this embodiment. The cooking device 1 includes a cabinet 10, and the cabinet 10 includes an inner cavity 11 having a cooking chamber 111, and at least one heating assembly 60. The inner cavity 11 is provided with an inclined plate 112 for forming the cooking chamber 111, and the inclined plate 112 is provided with an air inlet 1123 and an air outlet 1124. The at least one heating assembly 60 is arranged on the inclined plate 112 and located outside the cooking chamber 111, and is configured to discharge cold air out of the cooking chamber 111 from the air outlet 1124 and send hot air into the cooking chamber 111 from the air inlet 1123.

In one embodiment, when the cooking device 1 is used to heat food, the food is usually placed in the cooking chamber 111. After the heating assembly 60 is activated, the air in the cooking chamber 111 is sucked out through the air outlet 1124 under the action of the heating assembly 60 and enters the at least one heating assembly 60. The heating assembly 60 heats the incoming air and sends hot air into the cooking chamber 111 through the air inlet 1123, and the hot air entering the cooking chamber 111 heats and cooks the food. Since the inclined plate 112 is arranged inclined relative to the cooking chamber 111, by arranging the at least one heating assembly 60 on the inclined plate 112, the circulation path of the air between the heating assembly 60 and the cooking chamber 111 is shortened, and heat distribution in the cooking chamber 111 is more uniform, thus making the food heated evenly and improving the cooking quality of the food.

It should be pointed out that the inner cavity 11 includes a top plate 114 and a rear side plate 113, in which the top plate 114 and the rear side plate 113 are perpendicularly arranged spaced apart from each other, and the inclined plate 112 is connected to the top plate 114 and the rear side plate 113 respectively. When the number of heating assembly 60 is plural, heating assemblies 60 are arranged at intervals in a length direction of the inclined plate 112, to improve the coverage of the heating assemblies 60 to the cooking chamber 111 and effectively improving the heating quality of the food in the cooking chamber 111. At the same time, both the air inlet 1123 and the air outlet 1124 are arranged on the inclined plate 112, and the air inlet 1123 and the air outlet 1124 are arranged spaced apart. By adjusting the distance between the air outlet 1124 and the air inlet 1123, the hot air flow field in the cooking chamber 111 can be adjusted to further improve the uniformity of heating the food.

In addition, the number of air inlet 1123 is plural, and air inlets 1123 are arranged at intervals in a circumferential direction around the air outlet 1124. By providing air inlets 1123, the hot air entering the cooking chamber 111 is further increased, and the hot air is distributed more evenly in the cooking chamber 111, to improve the cooking effect of the food. In one embodiment, the arrangement of air inlets 1123 can improve the flowing speed of the air, and the cooking efficiency is effectively improved.

In addition, in some examples of this embodiment, the air inlet 1123 is of a first mesh structure, which can increase the amount of air entering the cooking chamber 111, to increase the heating rate of the food. The air outlet 1124 is of a second mesh structure, which can increase the air blowing-out rate of the cooking chamber 111, and the air circulation rate is increased, and the cooking efficiency of the food is further improved.

In some examples of this embodiment, the air inlet 1123 is a first grille, and the air outlet 1124 is a second grille. By arranging the air inlet 1123 as a first grille and arranging the air outlet 1124 as a second grille, the air blow-in and blow-out area is further increased, and the flowing speed of the air is improved. In addition, the first grille can also be provided with a first driving mechanism, and the second grille can also be provided with a second driving mechanism, in which the first driving mechanism is configured to adjust the angle of the first grille, and the second driving mechanism is configured to adjust the angle of the second grille, to realize the adjustment of the air flow direction, and the cooking device 1 can meet the cooking requirements of different foods.

Figure 18:
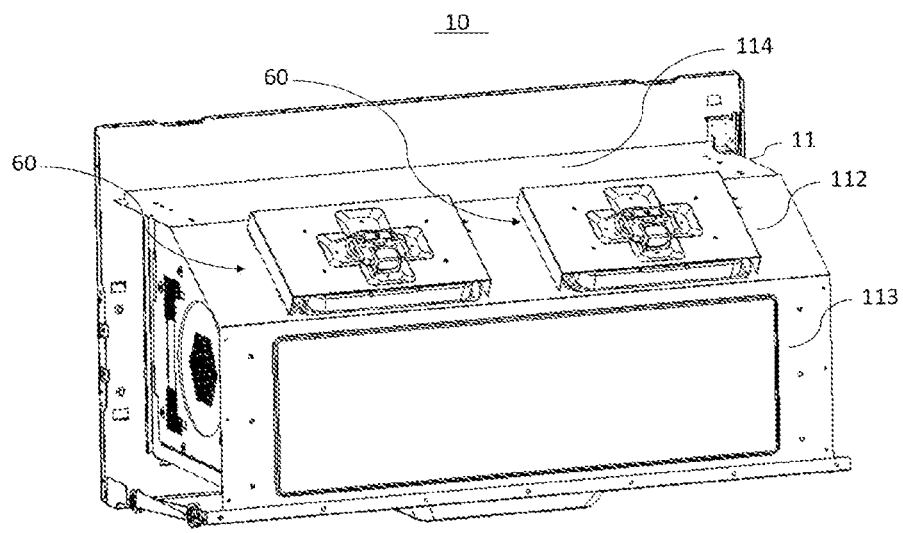
FIG. 18 is a schematic structural view of the cabinet shown in FIG. 17 when in another posture.
Figure 19:
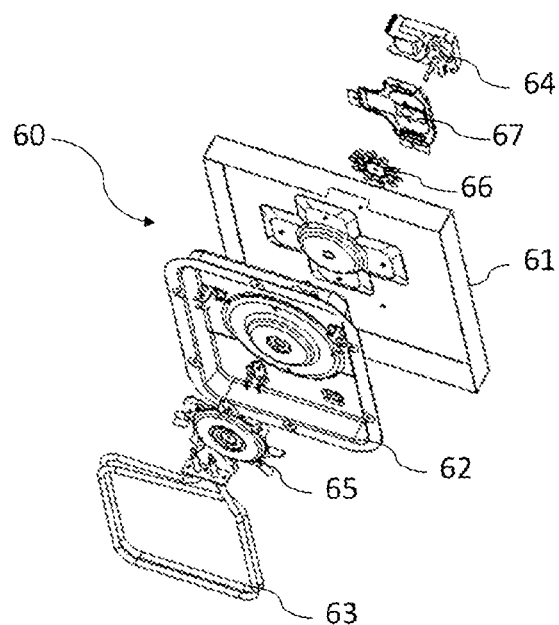
FIG. 19 is a schematic exploded structural view of a heating assembly of the cabinet shown in FIG. 17.
Figure 20:
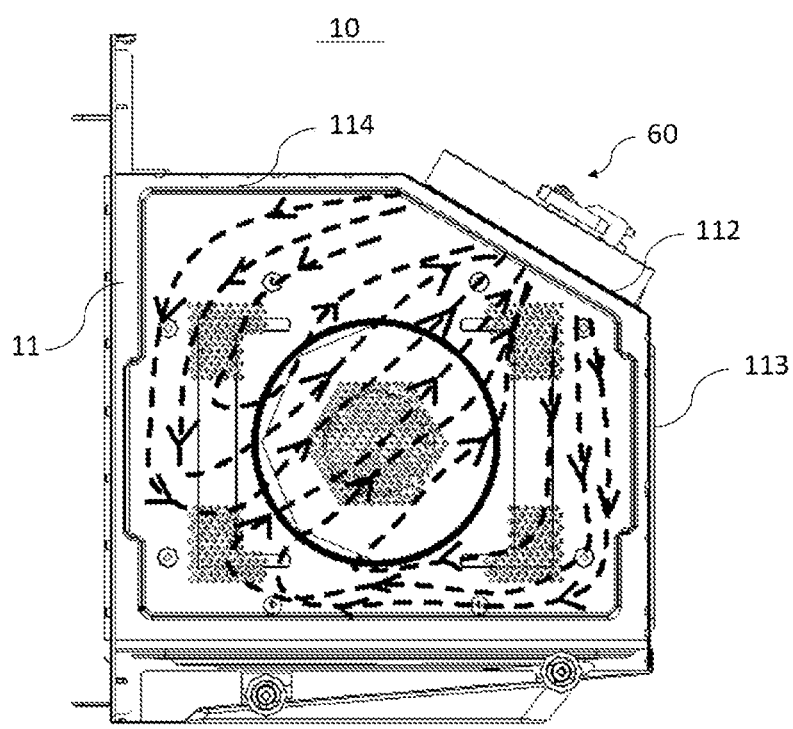
FIG. 20 is a cross-sectional view of the cabinet shown in FIG. 17 (black dotted arrow lines in the figure indicate the direction of airflow).

It is further understood that as shown in FIGS. 18 and 19, the heating assembly 60 includes an air duct shell 61, and the air duct shell 61 is arranged outside the inner cavity 11 and forms a hot air cavity with the inclined plate 112. Both the air inlet 1123 and the air outlet 1124 communicate with the hot air cavity. In one embodiment, the air duct shell 61 is arranged outside the inner cavity 11, and the air duct shell 61 cooperates with the inclined plate 112 to form the hot air cavity. The hot air cavity communicates with the cooking chamber 111 through the air inlet 1123 and the air outlet 1124 respectively. When the cooking device 1 is used to cook the food, under the action of the heating assembly 60, the air inside the cooking chamber 111 enters the hot air cavity from the air outlet 1124, and the air entering the hot air cavity is heated by the heating assembly 60 to form hot air; the heating assembly 60 sends the hot air into the cooking chamber 111 through the air inlet 1123, and the hot air is used to cook the food. By arranging the air duct shell 61, the air can circulate between the cooking chamber 111 and the hot air cavity, and during the circulation process, the air is effectively heated, and the heating and cooking of the food is carried out effectively, and the cooking quality of the food is further ensured.

It should be understood that the air duct shell 61 is arranged outside the inner cavity 11 and cooperates with the inclined plate 112, and the path of air flow can be reduced, heat loss of the hot air can be reduced, and the cooking efficiency of the food can be guaranteed, to reduce energy consumption of the cooking device 1.

It should be pointed out that the connection between the air duct shell 61 and the inclined plate 112 is a detachable connection, and the detachable connection may be screwing, clamping, riveting, etc. In some examples of this embodiment, the air duct shell 61 and the inclined plate 112 are connected and fixed by screws. By using screw connection and fixation for convenient assembly, the efficiency of assembly can be effectively improved and the production cost of the cooking device 1 can be reduced.

In addition, the inclined plate 112 is of a flat plate-like structure, the size of the air duct shell 61 is close to the width of the inclined plate 112 (the distance of the inclined plate 112 between the top plate 114 and the rear side plate 113), and the coverage area of the hot air cavity formed between the air duct shell 61 and the side wall of the inclined plate 112 on the inclined plate 112 is slightly smaller than the area of the inclined plate 112, to increase the coverage area of the hot air in the cooking chamber 111 and further improving the cooking quality of the food.

Further, as shown in FIG. 19, the heating assembly 60 further includes: a heating pipe cover 62, a heating pipe 63, a driving member 64 and a fan blade 65. The heating pipe cover 62, the heating pipe 63 and the fan blade 65 are all arranged in the hot air cavity, and the driving member 64 is arranged outside the hot air cavity and is drivingly connected to the fan blade 65. In one embodiment, the air duct shell 61 cooperates with the inclined plate 112 and a hot air cavity is formed therebetween. The fan blade 65, the heating pipe 63 and the heating pipe cover 62 are all arranged in the hot air cavity. The driving member 64 is arranged outside the hot air cavity, and a driving shaft of the driving member 64 passes through the air duct shell 61 before being drivingly connected to the fan blade 65. When the heating assembly 60 is activated, the driving member 64 drives the fan blade 65 to rotate, and the heating pipe 63 is energized to generate heat. Under the action of the fan blade 65, the air in the cooking chamber 111 enters the hot air cavity through the air outlet 1124. When the air entering the hot air cavity flows to the position of the heating pipe 63, it exchanges heat with the heating pipe 63, and the air is heated to form hot air. Under the action of the fan blade 65, the hot air enters the cooking chamber 111 through the air inlet 1123 to achieve heating and cooking of the food. The structure formed by the driving member 64 and the fan blade 65 effectively realizes the circulation of air between the cooking chamber 111 and the hot air cavity, and at the same time, the heating pipe 63 is used to effectively realize the heating of the air, to realize the heating and cooking of the food.

It should be pointed out that the heating pipe cover 62 is a half-shell structure with an opening. When installing the heating assembly 60, the opening of the heating pipe cover 62 is abutted and fixed on the inclined plate 112 (the heating pipe cover 62 and the inclined plate 112 are connected and fixed by fixing screws and other components), and the heating pipe cover 62 and the outer surface of the inclined plate 112 form a relatively closed heating space. The heating space communicates with the cooking chamber 111 through the air inlet 1123 and the air outlet 1124 respectively. The heating pipe 63 and the fan blade 65 are both arranged in the heating space, the driving shaft of the driving member 64 passes through the air duct shell 61 and the heating pipe cover 62 before being connected to the fan blade 65, and the air in the cooking chamber 111 circulates between the heating space and the cooking chamber 111. By providing the heating pipe cover 62, heat dissipation of the heating pipe 63 is further avoided, and the heating rate of the air is guaranteed. In addition, by providing the air duct shell 61 and the heating pipe cover 62, the heating pipe 63 can be further isolated from the outside, and the adverse influence of the heat of the heating pipe 63 on other components of the cooking device 1 can be effectively prevented, to reduce the failure rate of the cooking device 1.

In addition, in some examples of this embodiment, the driving member 64 is a motor, which has a simple structure and a good driving effect, and which effectively ensures the driving effect on the fan blade 65, to improve the efficiency of air flow and further improving the cooking quality of the food.

Further, the heating pipe 63 fits with the heating pipe cover 62 and is arranged in a circumferential direction of the fan blade 65. In one embodiment, in some examples of this embodiment, the heating pipe 63 is located on the radially outer side of the fan blade 65, and the heating pipe 63 forms a closed annular structure in the circumferential direction on the radially outer side of the fan blade 65. After the heating assembly 60 is activated, the heating pipe 63 and the driving member 64 are both energized, and the driving member 64 drives the fan blade 65 to rotate. Under the action of the fan blade 65, the air in the cooking chamber 111 enters between the heating pipe cover 62 and the outer surface of the inner cavity 11 through the air outlet 1124, and the air exchanges heat with the heating pipe 63 during the flow to form hot air. The formed hot air enters the cooking chamber 111 through the air inlet 1123 under the action of the fan blade 65 to achieve heating of the food in the cooking chamber 111. By arranging the heating pipe 63 in the circumferential direction of the fan blade 65, the uniformity of heating the air can be improved, and the uniformity of the hot air entering the cooking chamber 111 can be better, and the cooking effect of the food is further improved.

In some examples of this embodiment, the inclined plate 112 is of a rectangular structure, the heating pipe 63 is of a closed rectangular frame structure, and the fan blade 65 is located inside the rectangular frame, which further ensures the uniformity of heating.

In some examples of this embodiment, as shown in FIG. 19, the heating pipe 63 is of a closed circular frame structure, and the fan blade 65 is located in the circular frame structure. Since the fan blade 65 forms a circular air supply surface during the rotation of the fan blade 65, arranging the heating pipe 63 as a circular frame structure can further improve the heating efficiency of the air.

In some examples of this embodiment, the fan blade 65 is a centrifugal fan blade. By arranging the fan blade 65 as a centrifugal fan blade, when the driving member 64 drives the fan blade 65 to rotate, the air in the cooking chamber 111 enters the hot air assembly from the air outlet 1124 under the action of the fan blade 65. The air entering the hot air assembly flows out toward the radially outer side of the fan blade 65 from the center of the fan blade 65. During the process in which the air flows out toward the radially outer side of the fan blade 65, the air passes through the heating pipe 63. When passing through the heating pipe 63, the air is heated, and the air reaching the position of the air inlet 1123 is hot air, which enters the cooking chamber 111 from the air inlet 1123 to achieve heating and cooking of the food. By configuring the fan blade 65 as a centrifugal fan blade, hot air can be effectively supplied from the circumferential direction of the cooking chamber 111, and the cooking quality of the food in the cooking chamber 111 is effectively improved.

In addition, as shown in FIG. 19, the heating assembly 60 further includes a heat dissipation fan 66, which is arranged outside the air duct shell 61 and is driving connected with the driving member 64. In one embodiment, the heat dissipation fan 66 is sleeved over the driving shaft of the driving member 64. The heat dissipation fan 66 rotates synchronously with the driving shaft of the driving member 64, and the heat dissipation fan 66 can dissipate heat from the driving member 64 during rotation, to prevent the adverse influence of the heat on the driving member 64 and reducing the failure rate of the driving member 64.

Further, as shown in FIG. 19, the heating assembly 60 further includes a fixing bracket 67, and the driving member 64 is connected with the air duct shell 61 through the fixing bracket 67. The driving member 64 is installed on the air duct shell 61 through a first fixing member, to ensure the installation strength and stability of the driving member 64, and further ensuring the effective implementation of the heating in the cooking chamber 111 by the heating assembly 60.

Further, as shown in FIG. 1, the cooking device 1 further includes a fume exhaust duct 40 and a fan assembly 30, and the fan assembly 30 is arranged in the fume exhaust duct 40. In one embodiment, the fan assembly 30 of the cooking device 1 is arranged in the fume exhaust duct 40. When the cooking device 1 is used for cooking, the fan assembly 30 is activated, and the oil fume generated during the cooking process is discharged through the fume exhaust duct 40, thus preventing the whole cooking process from the intrusion of oil fume, and effectively improving the user experience.

It should be pointed out that a fan body 3131 of the fan assembly 30 is arranged corresponding to the inclined plate 112, to avoid the influence of the fan body 3131 on the cooking chamber 111, and the volume of the cooking chamber 111 is effectively increased.

In some examples of this embodiment, the fume exhaust duct 40 is provided in the cabinet 10. The cabinet 10 further includes a rear plate, which is arranged spaced apart from the rear side plate 113 of the inner cavity 11. The rear plate is connected and fixed to the casing, and the fume exhaust duct 40 is formed between the rear plate and the rear side plate 113 of the inner cavity 11. The fan assembly 30 is located in the fume exhaust duct 40, and the fan body 31 of the fan assembly 30 is arranged corresponding to the inclined plate 112, and the cabinet 10 has the function of extracting oil fume, and at the same time, the influence on the volume of the cooking chamber 111 is reduced.

In some examples of this embodiment, as shown in FIG. 1, the cooking device 1 further includes an installation bracket 20, the cabinet 10 is detachably arranged on the installation bracket 20, and the fume exhaust duct 40 is arranged in the installation bracket 20. In one embodiment, the installation bracket 20 is arranged on the wall 2, the cabinet 10 is arranged on the installation bracket 20, and the cabinet 10 fits with the installation bracket 20 in a detachable manner. The fume exhaust duct 40 is arranged in the installation bracket 20. By providing the installation bracket 20, the disassembly and assembly of the cabinet 10 is facilitated, and the convenience in the assembly and maintenance process of the cooking device 1 is effectively improved; in addition, by arranging the fume exhaust duct 40 in the installation bracket 20, the influence of the fume exhaust duct 40 on the cooking chamber 111 is effectively avoided.

Further, as shown in FIG. 1, a stove 50 is arranged below the cabinet 10 of the cooking device 1, and an inlet of the fume exhaust duct 40 is arranged close to the stove 50. The stove 50 and the cabinet 10 are spaced apart up-and-down, and the cabinet 10 is suspended above the stove 50 by the installation bracket 20. When the stove 50 is cooking the food, the oil fume and/or water vapor generated during the cooking process enters the fume exhaust duct 40 through the inlet of the fume exhaust duct 40 under the action of the fan assembly 30, and is discharged collectively, which further avoids the oil fume generated during the cooking process and further improves the user experience.

What is claimed is:

1. A cooking device comprising:
    a cabinet, the cabinet comprising:
    an inner cavity, which is provided with a cooking chamber, as well as a first side wall and a second side wall that are arranged opposite to each other, the first side wall being provided with a first ventilation structure, and the second side wall being provided with a second ventilation structure;
    a first heating assembly arranged outside the inner cavity and arranged corresponding to the first ventilation structure, and configured to circularly heat air in the cooking chamber;
    a second heating assembly arranged outside the inner cavity and arranged corresponding to the second ventilation structure, and configured to circularly heat the air in the cooking chamber; and
    a third heating assembly arranged above the inner cavity and configured to circularly heat the air in the cooking chamber;
    wherein the third heating assembly is arranged on an inclined plate above the inner cavity, the inclined plate is provided with a third air inlet hole configured to send hot air into the cooking chamber and a third air outlet hole configured to discharge cold air out of the cooking chamber.

2. The cooking device according to claim 1, wherein the first ventilation structure comprises a first air inlet hole and at least one first air outlet hole, the first air inlet hole is located in the middle of the first side wall, and the first heating assembly is configured to suck out the air in the cooking chamber from the at least one first air outlet hole, heat the sucked-out air, and then send it into the cooking chamber through the first air inlet hole, wherein the first heating assembly comprises:

a first air duct shell, which is arranged outside the first side wall and forms a first hot air cavity with the first side wall, and both the first air inlet hole and the at least one first air outlet hole communicate with the first hot air cavity, wherein the first heating assembly further comprises a first heating pipe cover, a first heating pipe, a first driving member and a first fan blade, wherein the first heating pipe cover, the first heating pipe and the first fan blade are all arranged in the first hot air cavity, and the first driving member is arranged outside the first hot air cavity and is drivingly connected with the first fan blade, wherein the first heating pipe fits with the first heating pipe cover and is arranged in a circumferential direction of the first fan blade, and wherein the first fan blade is a first axial flow fan blade.

3. The cooking device according to claim 2, wherein the first side wall is formed with a first raised structure with a first air outflow end face on a side facing the cooking chamber, the first fan blade is arranged corresponding to the first raised structure, and the first air outlet hole is provided on the first air outflow end face, wherein the second ventilation structure comprises a second air inlet hole and at least one second air outlet hole, the second air inlet hole is located in the middle of the second side wall, and the second heating assembly is configured to suck out the air in the cooking chamber from the at least one second air outlet hole, heat the sucked-out air, and then send it into the cooking chamber through the second air inlet hole, wherein the second heating assembly comprises a second air duct shell, which is arranged outside the second side wall and forms a second hot air cavity with the second side wall, and both the second air inlet hole and the at least one second air outlet hole communicate with the second hot air cavity, wherein the second heating assembly further comprises a second heating pipe cover, a second heating pipe, a second driving member and a second fan blade, and wherein the second heating pipe cover, the second heating pipe and the second fan blade are all arranged in the second hot air cavity, and the second driving member is arranged outside the second hot air cavity and is drivingly connected with the second fan blade, wherein the second heating pipe fits with the second heating pipe cover and is arranged in a circumferential direction of the second fan blade, wherein the second fan blade is a second axial flow fan blade, wherein the second side wall is formed with a second raised structure with a second air outflow end face on a side facing the cooking chamber, the second fan blade is arranged corresponding to the second raised structure, and the second air outlet hole is provided on the second air outflow end face, and wherein the second air outflow end face is parallel to the first air outflow end face.

4. The cooking device according to claim 1, wherein the cooking device further comprises a fume exhaust duct and a fan assembly, and the fan assembly is arranged in the fume exhaust duct, wherein the cooking device further comprises an installation bracket, the cabinet is detachably arranged on the installation bracket, and the fume exhaust duct is arranged in the cabinet or in the installation bracket.

5. The cooking device according to claim 1, wherein the third heating assembly comprises a third air duct shell arranged outside the inner cavity and forming a third hot air cavity together with the inclined plate, and both the third air inlet hole and the third air outlet hole communicate with the third hot air cavity.

6. The cooking device according to claim 5, wherein the third heating assembly further comprises a third heating pipe cover, a third heating pipe, a third driving member and a third fan blade, and wherein the third heating pipe cover, the third heating pipe and the third fan blade are all arranged in the third hot air cavity, and the third driving member is arranged outside the third hot air cavity and drivingly connected with the third fan blade, wherein the third heating pipe fits with the third heating pipe cover and is arranged in a circumferential direction of the third fan blade.

* * * * *